(12) United States Patent
Kanehara et al.

(10) Patent No.: US 12,527,101 B2
(45) Date of Patent: Jan. 13, 2026

(54) IMAGING DEVICE

(71) Applicant: Panasonic Intellectual Property Management Co., Ltd., Osaka (JP)

(72) Inventors: Hidenari Kanehara, Kyoto (JP); Yoshihiro Sato, Osaka (JP); Takayoshi Yamada, Hyogo (JP); Akio Nakajun, Toyama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 387 days.

(21) Appl. No.: 18/183,227

(22) Filed: Mar. 14, 2023

(65) Prior Publication Data
US 2023/0215882 A1 Jul. 6, 2023

Related U.S. Application Data

(63) Continuation of application No. PCT/JP2021/033076, filed on Sep. 9, 2021.

(30) Foreign Application Priority Data

Sep. 29, 2020 (JP) ................. 2020-163149

(51) Int. Cl.
*H01L 27/146* (2006.01)
*H10F 39/00* (2025.01)
(52) U.S. Cl.
CPC ..... *H10F 39/8023* (2025.01); *H10F 39/8063* (2025.01); *H10F 39/811* (2025.01)
(58) Field of Classification Search
CPC ............ H10F 39/8023; H10F 39/8063; H10F 39/811; H10F 39/12; H10F 39/191;
(Continued)

(56) References Cited

U.S. PATENT DOCUMENTS 6,831,692 B1 * 12/2004 Oda .................... H10F 39/8057
348/241
10,825,846 B2 * 11/2020 Kobinata ............. H10F 39/802
(Continued)

FOREIGN PATENT DOCUMENTS

CN 106254726 A 12/2016
CN 109300923 A 2/2019
(Continued)

OTHER PUBLICATIONS

International Search Report of PCT application No. PCT/JP2021/033076 dated Oct. 19, 2021.
(Continued)

*Primary Examiner* — Jarrett J Stark
(74) *Attorney, Agent, or Firm* — Rimon P.C.

(57) ABSTRACT

An imaging device includes a counter electrode, a photoelectric conversion layer that converts light into a signal charge, a plurality of sets of electrodes each of which collects the signal charge, each of the plurality of sets including a first electrode included in a high-sensitivity pixel and a second electrode included in a low-sensitivity pixel, and an auxiliary electrode which is located, as seen in plan view, between the first electrode and the second electrode in each of the plurality of sets and which is commonly included in the high-sensitivity pixel and the low-sensitivity pixel. The distance between the first electrode and the auxiliary electrode is different from the distance between the second electrode and the auxiliary electrode.

5 Claims, 29 Drawing Sheets

(58) Field of Classification Search
CPC ............... H10F 39/802; H10F 39/8027; H10F 39/8053; H10F 39/8037; H10F 39/8057; H10F 39/813; H04N 25/57; H04N 25/65; H04N 25/70

See application file for complete search history.

(56) References Cited

U.S. PATENT DOCUMENTS

| | | | |
|---|---|---|---|
| 11,532,652 B2* | 12/2022 | Takase | H10F 39/192 |
| 11,646,328 B2* | 5/2023 | Kobinata | H10F 39/191 |
| | | | 257/292 |
| 2004/0017497 A1* | 1/2004 | Suzuki | H04N 25/585 |
| | | | 348/294 |
| 2014/0117486 A1* | 5/2014 | Doi | H10F 39/191 |
| | | | 257/448 |
| 2016/0037098 A1* | 2/2016 | Lee | H10K 39/32 |
| | | | 257/292 |
| 2016/0105622 A1 | 4/2016 | Tamaki | |
| 2016/0119562 A1 | 4/2016 | Takase et al. | |
| 2016/0190188 A1 | 6/2016 | Murakami et al. | |
| 2016/0360134 A1* | 12/2016 | Miyake | H10F 39/802 |
| 2017/0163917 A1* | 6/2017 | Yamada | H04N 25/585 |
| 2017/0214873 A1 | 7/2017 | Nishimura et al. | |
| 2018/0240847 A1 | 8/2018 | Ota et al. | |
| 2018/0241954 A1* | 8/2018 | Miyake | H04N 25/75 |
| 2018/0249104 A1 | 8/2018 | Sasago et al. | |
| 2019/0035832 A1* | 1/2019 | Kobinata | H04N 25/532 |
| 2021/0013252 A1* | 1/2021 | Kobinata | H10F 39/8023 |
| 2021/0258520 A1* | 8/2021 | Kobayashi | H04N 25/50 |

FOREIGN PATENT DOCUMENTS

| | | |
|---|---|---|
| JP | 2000-125209 | 4/2000 |
| JP | 2016-076921 | 5/2016 |
| JP | 2016-086407 A | 5/2016 |
| JP | 2017-005051 | 1/2017 |
| JP | 2017-046333 | 3/2017 |
| JP | 2017-108380 | 6/2017 |
| JP | 2017-135696 | 8/2017 |
| JP | 2018-139375 | 9/2018 |
| JP | 2019-029656 A | 2/2019 |

OTHER PUBLICATIONS

English Translation of Chinese Search Report dated May 29, 2025 for the related Chinese Patent Application No. 202180061810.6.

* cited by examiner

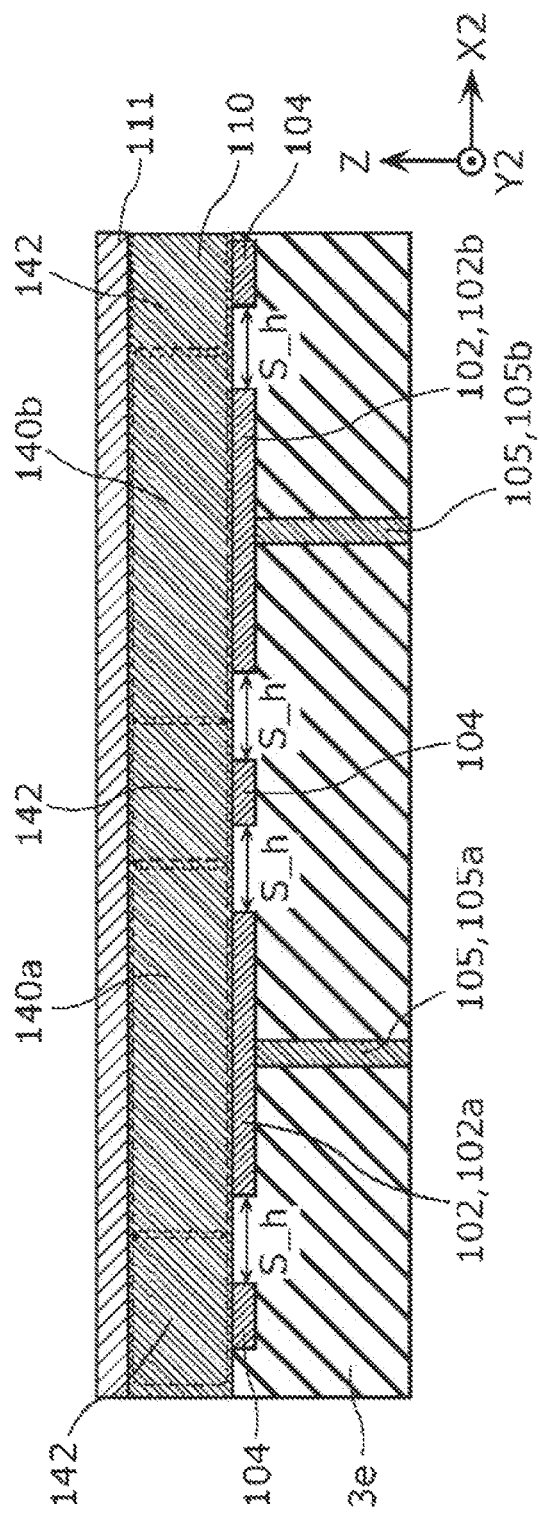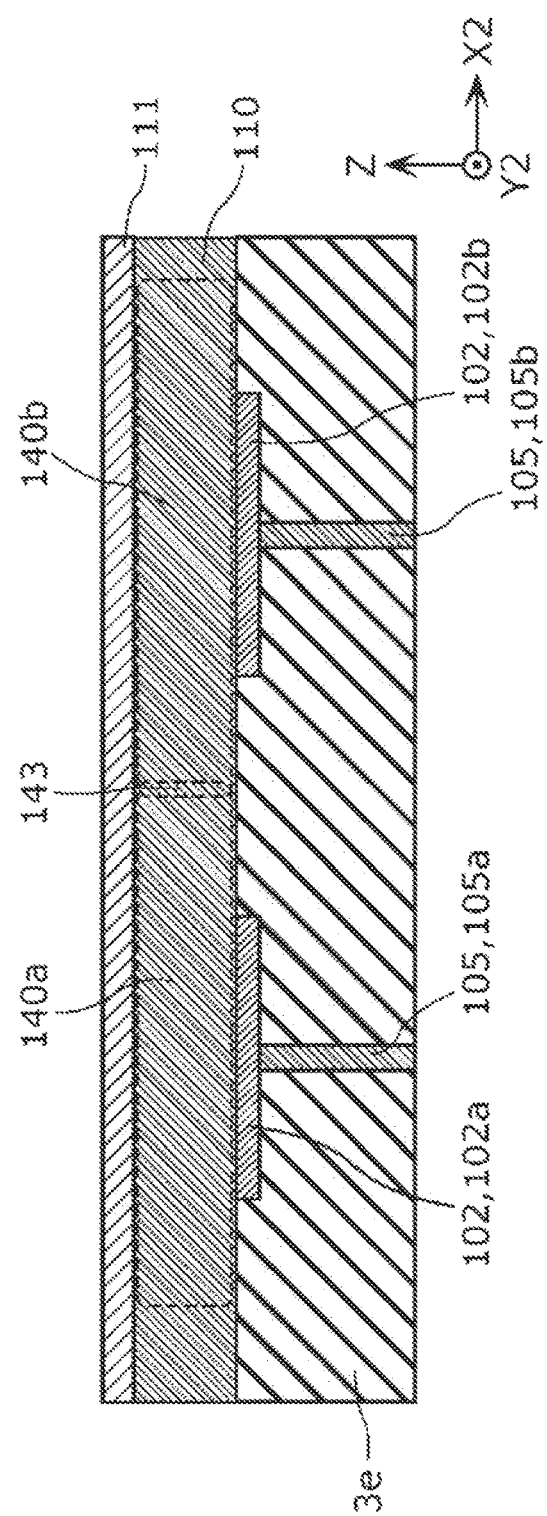

FIG. 15
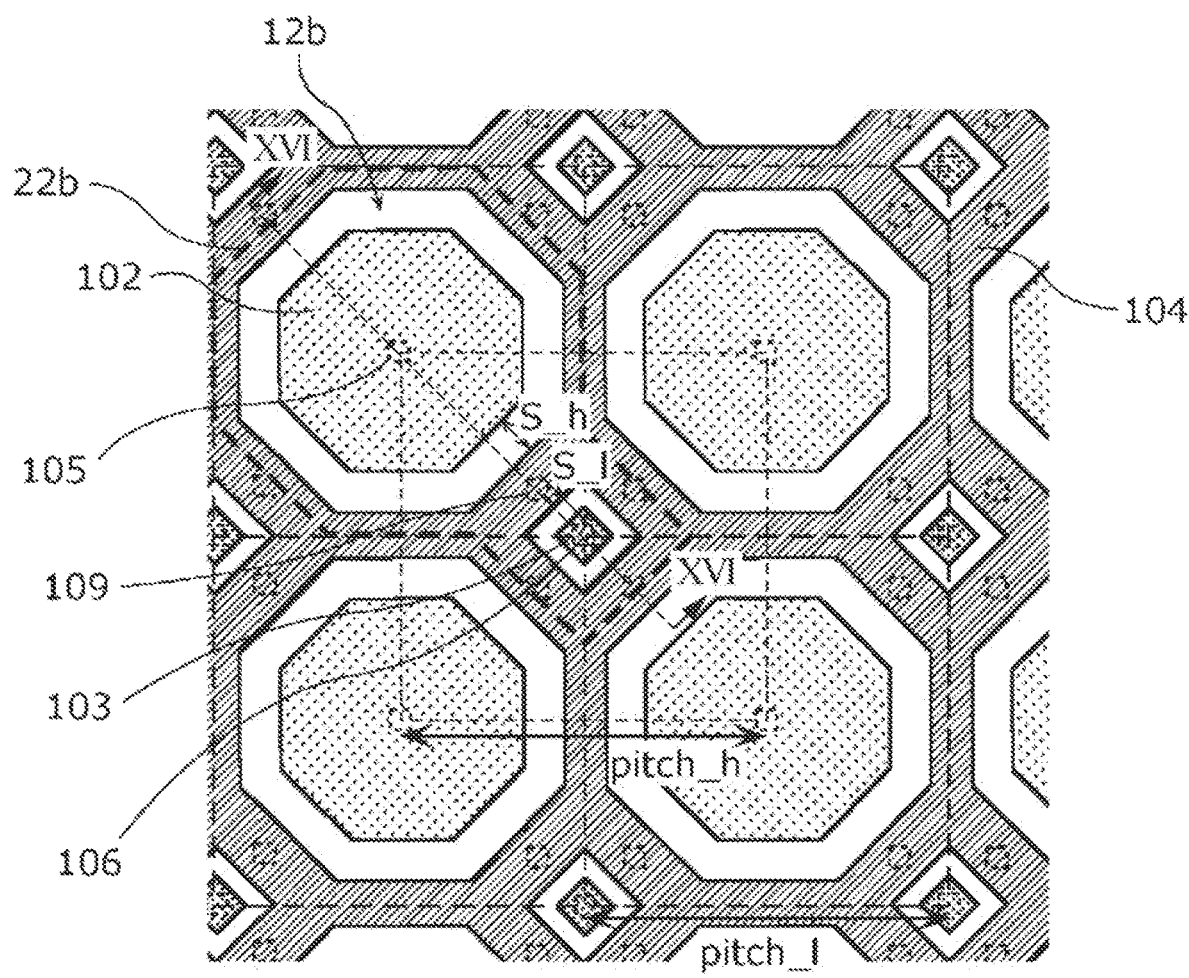
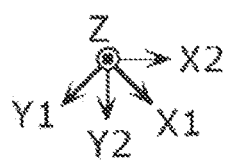

IMAGING DEVICE

BACKGROUND

1. Technical Field

The present disclosure relates to an imaging device.

2. Description of the Related Art

In recent years, proposals have been made to realize a wide dynamic range in imaging using an imaging device such as a CCD (Charge Coupled Device) image sensor, a CMOS (Complementary MOS) image sensor, or the like. For example, Japanese Patent No. 4018820 discloses an imaging device capable of expanding the dynamic range. In the imaging device disclosed in Japanese Patent No. 4018820, a photodiode with a large area is disposed in a high-sensitivity pixel cell, and a photodiode with a small area is disposed in a low-sensitivity pixel cell. Japanese Patent No. 6213743 proposes an imaging device including a photoelectric conversion layer capable of expanding the dynamic range.

SUMMARY

In one general aspect, the techniques disclosed here feature an imaging device including a counter electrode, a photoelectric conversion layer that converts light into a signal charge, a plurality of sets of electrodes facing the counter electrode via the photoelectric conversion layer to collect the signal charge, each of the plurality of sets including a first electrode included in a high-sensitivity pixel and a second electrode included in a low-sensitivity pixel with a sensitivity lower than a sensitivity of the high-sensitivity pixel, and an auxiliary electrode that is located between the first electrode and the second electrode in each of the plurality of sets in plan view, the auxiliary electrode facing the counter electrode via the photoelectric conversion layer, the auxiliary electrode being included commonly in the high-sensitivity pixel and the low-sensitivity pixel. A distance between the first electrode and the auxiliary electrode is different from a distance between the second electrode and the auxiliary electrode.

It should be noted that general or specific embodiments may be implemented as a component, a device, an apparatus, a system, a method, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is a schematic cross-sectional view of a pixel taken along line VIA-VIA of FIG. 4 according to the first embodiment;

FIG. 6B is a schematic cross-sectional view of a pixel having no auxiliary electrode;

FIG. 15 is a plan view showing an example of a pixel electrode layout according to a second modification of the third embodiment;

DETAILED DESCRIPTIONS

Figure 1:
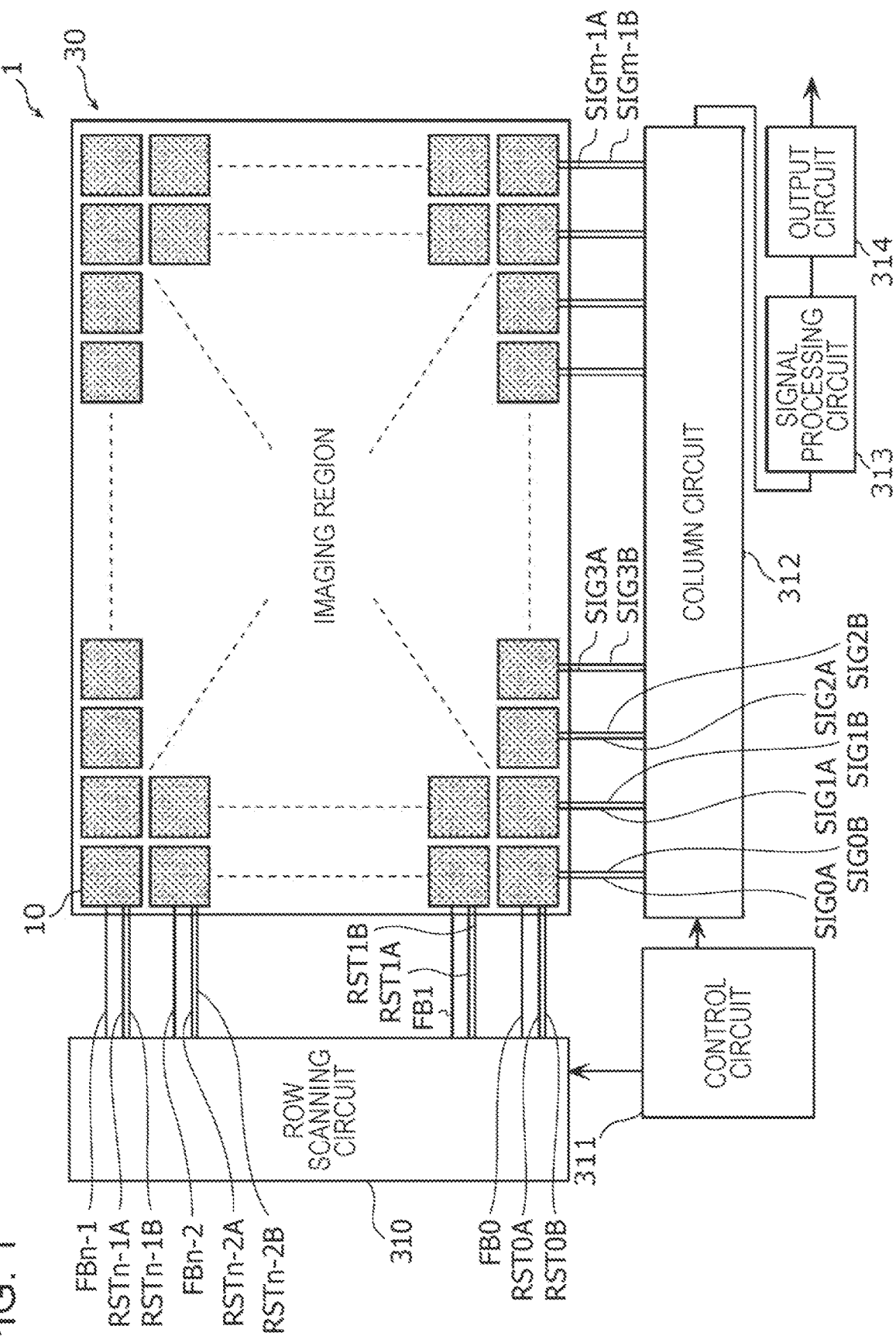
FIG. 1 is a block diagram showing an example of a configuration of an imaging device according to a first embodiment.

In the imaging device disclosed in Japanese Patent No. 4018820, when the illuminance is so high that the electric charge generated in the low-sensitivity pixel cell is saturated, it is difficult to dynamically reduce the sensitivity to suppress the saturation, which causes a reduction in the dynamic range. In the imaging device disclosed in Japanese Patent No. 6213743, a problem may occur due to color mixing between pixels adjacent to each other. To suppress the color mixing, it is necessary to reduce the area of a pixel electrode that collects a signal charge to as small a level as possible, and it is necessary that adjacent pixels are sufficiently spaced. Therefore, suppressing the color mixing causes a reduction in the efficiency of collecting signal charges.

In view of the above situation, one non-limiting and exemplary embodiment provides an imaging device capable of efficiently collecting signal charges and capable of achieving a wide dynamic range in imaging while suppressing the color mixing between adjacent pixels.

In an aspect, the present disclosure provide an imaging device including a counter electrode, a photoelectric conversion layer that converts light into a signal charge, a plurality of sets of electrodes facing the counter electrode via the photoelectric conversion layer to collect the signal charge, each of the plurality of sets including a first electrode included in a high-sensitivity pixel and a second electrode included in a low-sensitivity pixel with a sensitivity lower than a sensitivity of the high-sensitivity pixel, and an auxiliary electrode that is located between the first electrode and the second electrode in each of the plurality of sets in plan view, the auxiliary electrode facing the counter electrode via the photoelectric conversion layer, the auxiliary electrode being included commonly in the high-sensitivity pixel and the low-sensitivity pixel. The distance between the first electrode and the auxiliary electrode is different from the distance between the second electrode and the auxiliary electrode.

By disposing the auxiliary electrode commonly included in the high-sensitivity pixel and the low-sensitivity pixel in the above-described manner, the auxiliary electrode is disposed in a high efficiency manner. Therefore, it is possible to reduce the area of the auxiliary electrode while suppressing color mixing between adjacent pixels. Therefore, it is also possible to prevent a reduction in the region where the signal charge is collected by the first electrode and the second electrode. By providing a difference between the distance from the first electrode to the auxiliary electrode and the distance from the second electrode to the auxiliary electrode, it is possible to change areas where the first electrode and the second electrode can collect the signal charge, and thus it is possible to change the ratio of the sensitivity of the high-sensitivity pixel to the sensitivity of the low-sensitivity pixel. Therefore, it is possible to increase the dynamic range by properly adjusting the relationship between the distance from the first electrode to the auxiliary electrode and the distance from the second electrode to the auxiliary electrode. Thus, the imaging device can efficiently collect the signal charge and can realize a wide dynamic range in imaging while suppressing color mixing between adjacent pixels.

For example, the first electrode included in each of the plurality of sets may be located on a lattice point of a first square lattice in plan view, the second electrode included in each of the plurality of sets may be located on a lattice point of a second square lattice different from the first square lattice in plan view, and the length of one side of a unit lattice of the first square lattice may be equal to the length of one side of a unit lattice of the second square lattice.

In this case, because the length of one side of the unit lattice of the first square lattice is equal to the length of one side of the unit lattice of the second square lattice, the vertical and horizontal resolutions of the high-sensitivity pixels are equal to those of the low-sensitivity pixels. Therefore, the imaging device can perform imaging with a wide dynamic range without deteriorating the resolution.

For example, in each of the plurality of sets, the distance between the first electrode and the auxiliary electrode may be greater than the distance between the second electrode and the auxiliary electrode.

In this case, because the distance between the first electrode and the auxiliary electrode is larger than the distance between the second electrode and the auxiliary electrode, compared to the case where the distance between the first electrode and the auxiliary electrode is the same as the distance between the second electrode and the auxiliary electrode, a large value is obtained for the ratio of the region where the first electrode captures the signal charge to the region where the second electrode captures the signal charge. Furthermore, the ratio of the coupling capacity between the first electrode and the auxiliary electrode to the coupling capacity between the second electrode and the auxiliary electrode becomes large. As a result, it is possible to increase the ratio of the sensitivity of the high-sensitivity pixel to the sensitivity of the low-sensitivity pixel. Therefore, it is possible to further increase the dynamic range of the imaging device. For example, in each of the plurality of sets, the distance between the first electrode and the auxiliary electrode may be less than the distance between the second electrode and the auxiliary electrode.

For example, the auxiliary electrode may have a first surface facing the photoelectric conversion layer and a second surface opposite to the first surface, the imaging device further includes a plug connected to the second surface, the first electrode of a first set of the plurality of sets and the first electrode of a second set of the plurality of sets may be adjacent to each other via the auxiliary electrode, and the plug may be located between the first electrode of the first set and the first electrode of the second set in plan view.

By providing the plug such that the plug is disposed between adjacent first electrodes and thus the plug is disposed between plugs respectively connected to the adjacent first electrodes in the above-described manner, it is possible to reduce the capacitance between the plugs respectively connected to the adjacent first electrodes. Therefore, it is possible to suppress the occurrence of electrical color mixing between adjacent pixels of the imaging device.

For example, the auxiliary electrode may have a first surface facing the photoelectric conversion layer and a second surface opposite to the first surface, the imaging device may further include a plug connected to the second surface, the second electrode of a third set of the plurality of sets and the second electrode of a fourth set of the plurality of sets may be adjacent to each other via the auxiliary electrode, and the plug may be located between the second electrode of the third set and the second electrode of the fourth set in plan view.

By providing the plug such that the plug is disposed between adjacent second electrodes and thus the plug is disposed between plugs respectively connected to the adjacent second electrodes in the above-described manner, it is possible to reduce the capacitance between the plugs respectively connected to the adjacent second electrodes. Therefore, it is possible to suppress the occurrence of electrical color mixing between adjacent pixels of the imaging device.

For example, the auxiliary electrode may have a first surface facing the photoelectric conversion layer and a second surface opposite to the first surface, the imaging device may further include a plug connected to the second surface, the plurality of sets of electrodes may include first electrodes and second electrodes, each of the first electrodes may be the first electrode, each of the second electrodes may be the second electrode, and in plan view, the distance between the plug and the second electrode that is closest, of the second electrodes, to the plug may be smaller than the distance between the plug and the first electrode that is closest, of the first electrodes, to the plug.

When the distance between the second electrode and the third auxiliary electrode plug is smaller than the distance between the first electrode and the third auxiliary electrode plug as described above, the ratio of the capacitance of the second electrode to the capacitance of the first electrode becomes large compared with the case where no third auxiliary electrode plug is provided. As a result, a reduction occurs in the ratio of the sensitivity of the low-sensitivity pixel to the sensitivity of the high-sensitivity pixel. Therefore, it is possible to further increase the dynamic range of the imaging device.

For example, in each of the plurality of sets, the area of the first electrode may be greater than the area of the second electrode in plan view.

In this case, the area of the region where the first electrode collects the signal charge becomes larger than the area of the region where the second electrode collects the signal charge. As a result, the ratio of the sensitivity of the high-sensitivity pixel to the sensitivity of the low-sensitivity pixel becomes large. Thus, it is possible to further increase the dynamic range of the imaging device.

For example, in each of the plurality of sets, the area of the first electrode may be equal to the area of the second electrode in plan view.

When the area of the first electrode and the area of the second electrode are equal to each other as described above, it becomes easy to produce the electrodes.

For example, the imaging device may further include a first charge storage region that stores the signal charge collected by the first electrode, and a second charge storage region that stores the signal charge collected by the second electrode, and the capacitance of the second charge storage region may be greater than the capacitance of the first charge storage region.

When the capacitance of the second charge storage region that stores the signal charge collected by the second electrode included in the low-sensitivity pixel is greater than the capacitance of the first charge storage region that stores the signal charge collected by the first electrode included in the high-sensitivity electrode as described above, the ratio of the sensitivity of the high-sensitivity pixel to the sensitivity of the low-sensitivity pixel becomes large. Thus, it is possible to further increase the dynamic range of the imaging device.

For example, the imaging device may further include a first microlens facing the photoelectric conversion layer via the counter electrode and overlapping with the first electrode in plan view.

In this structure, the first microlens collects the light incident on the first electrode, and the signal charge is easily generated on the first electrode, which results in an increase in the sensitivity of the high-sensitivity pixel. Therefore, it is possible to further increase the dynamic range of the imaging device.

For example, the imaging device may further include a second microlens facing the photoelectric conversion layer via the counter electrode and overlapping with the second electrode in plan view, and the light collecting area of the first microlens may be larger than the light collecting area of the second microlens.

In this structure, because the light collecting area of the first microlens is larger than the light collecting area of the second microlens, a larger amount of light is incident on the first electrode than on the second electrode, the ratio of the sensitivity of the high-sensitivity pixel to the sensitivity of the low-sensitivity pixel becomes high. Therefore, it is possible to further increase the dynamic range of the imaging device. Furthermore, light is collected on the first electrode and the second electrode, and thus the first electrode and the second electrode can efficiently collect the signal charge. For example, the auxiliary electrode may be a single electrode having a plurality of openings. For example, the plurality of openings may include a first opening and a second opening adjacent to the first opening, the first electrode may be located in the first opening, and the second electrode may be located in the second opening.

Embodiments of the present disclosure are described in detail below with reference to the drawings.

Note that each of the embodiments described below is provided to illustrate a comprehensive or specific example. The numerical values, shapes, materials, constituent elements, manners of disposing constituent elements, manners of connecting constituent elements, processing steps, orders of processing steps, etc. shown in the following embodiments are merely examples and are not intended to limit the present disclosure. Various aspects described herein may be combined with each other as long as no conflict occurs. Among constituent elements described in the following embodiments, those constituent elements that are not described in independent claims indicating highest-level concepts of the present disclosure are optional. In the following descriptions, constituent elements which are substantially the same in function are denoted by similar reference symbols or numerals, and a duplicated description thereof may be omitted.

Each figure provides a schematic view and is not necessarily exactly illustrated. Therefore, each drawing is not necessarily precise in terms of, for example, the scales or the like.

In the present specification, a term indicating a relationship between elements such as "equal", a term indicating a shape of an element such as a "rectangular", "circular", or the like, and numerical ranges are not necessarily limited to strict expressions meant thereby, but they may represent substantially equivalent values or ranges. For example, "equal" may represent being equal with a difference less than a few percent.

Furthermore, in the present specification, the terms "upper", "above", "lower", and "below" do not necessarily refer to strict directions such as vertically upward or vertically downward in absolute spatial recognition, but these terms are used to represent relative locations in a multilayer structure. More specifically, in the imaging device, a side on which light incident is an upper side and a side opposite to the light receiving side is a lower side, and the upper side is located above the lower side. Similarly, for the "upper surface" and "lower surface" of each constituent element, the surface on the light receiving side of the imaging device is referred to as the "upper surface", and the surface opposite to the light receiving side is referred to as the "lower surface". The terms "above", "upper", "below", "lower", "upper surface", and "lower surface" are used only to specify relative locations of constituent elements, and these terms are used not for limiting the posture of the imaging device in use. The terms "above", "upper", "below", and "lower" are used in not only in a case where two constituent elements are located apart from each other and there is another constituent element between them but also in a case where two constituent elements are located in direct contact with each other. In the present specification, an expression "as seen in plan view" means a view as seen in a direction perpendicular to the semiconductor substrate.

First Embodiment

A configuration of an imaging device according to a first embodiment is described below.

FIG. 1 is a block diagram showing an example of a configuration of an imaging device 1 according to the first embodiment. As shown in FIG. 1, the imaging device 1 includes a pixel array 30 including a plurality of pixels 10 and peripheral circuits. The pixels 10 are two-dimensionally arranged on a semiconductor substrate so as to form an imaging region. In the example shown in FIG. 1, the pixels 10 are arranged in a matrix of m rows and n columns. Here, m and n are integers equal to or larger than 1 and m+n≥3.

In the example shown in FIG. 1, the center of each pixel 10 is located on a lattice point of a square lattice.

In the example of the configuration shown in FIG. 1, the peripheral circuits includes a row scanning circuit 310, a column circuit 312, a signal processing circuit 313, an output circuit 314, and a control circuit 311. The peripheral circuits may be disposed such that all peripheral circuits are disposed on the semiconductor substrate on which the pixel array 30 is formed, or such that a part of the peripheral circuits are disposed on another substrate.

The row scanning circuit 310 has connections to reset control lines RSTiA and RSTiB and feedback control lines FBi. The reset control lines RSTiA and RSTiB and the feedback control lines FBi are provided such that one set of these lines is provided for each line of the pixel array 30. That is, among the plurality of pixels 10, all one or more pixels 10 belonging to an i-th row are connected to the reset control lines RSTiA and RSTiB and the feedback control line FBi. Here, i=0, 1, . . . , n−2, n−1.

The row scanning circuit 310 has connections with address control lines not shown in FIG. 1 (address control lines SELA and SELB in FIG. 2 described later). Like the reset control lines RSTiA and RSTiB and the feedback control lines FBi, the address control lines are also provided for each row of the pixel array 30 and are connected to all one or more pixels 10 belonging to the i-th line. The row scanning circuit 310 selects pixels 10 in units of rows by applying a predetermined voltage to the address control line, and reads signal voltages, and performs a reset operation described later. The row scanning circuit 310 is also called a vertical scanning circuit.

The column circuit 312 has connections with vertical signal lines SIGjA and SIGjB. The vertical signal lines SIGjA and SIGjB are provided such that one vertical signal line SIGjA and one vertical signal line SIGjB are provided for each column of the pixel array 30. That is, among the plurality of pixels 10, all one or more pixels 10 belonging to a j-th column are connected to the vertical signal lines SIGjA and SIGjB. Here, j=0, 1, 2, 3, . . . , m−1. Output signals from the pixels 10 selected in units of rows by the row scanning circuit 310 are read out to the column circuit 312 via the vertical signal lines SIGjA and SIGjB. The column circuit 312 performs noise suppression signal processing typified by correlated double sampling and an analog-to-digital conversion (AD conversion) and the like on the output signals read from the pixels 10.

The signal processing circuit 313 performs various processes on the image signals acquired from the pixels 10. In the present description, the "image signal" refers to an output signal used for forming an image among various signals read out via the vertical signal lines SIGjA and SIGjB. As will be described in detail later, each pixel 10 includes a first imaging cell with a high sensitivity and a second imaging cell with a low sensitivity and high saturation, and the column circuit 312 reads a high-sensitivity image signal from the first imaging cell and a low-sensitivity image signal from the second imaging cell. In the present description, the first imaging cell is an example of a high-sensitivity pixel, and the second imaging cell is an example of a low-sensitivity pixel. The first imaging cell and the second imaging cell are, for example, sub-pixels included in pixel 10. The signal processing circuit 313 generates a wide dynamic range image based on, for example, the high-sensitivity image signal and the low-sensitivity image signal read by the column circuit 312. The output from the signal processing circuit 313 is read out to the outside of the imaging device 1 via the output circuit 314. The signal processing circuit 313 performs a process of generating image data of one luminance value or the like for each of the plurality of pixels 10 based on, for example, at least one of the high-sensitivity image signal and the low-sensitivity image signal respectively output from the first imaging cell and the second imaging cell included in each pixel 10.

The control circuit 311 receives, for example, command data and a clock signal from the outside of the imaging device 1, and controls the entire imaging device 1. The control circuit 311 includes, for example, a timing generator and supplies drive signals to the row scanning circuit 310, the column circuit 312, and the like.

Figure 2:
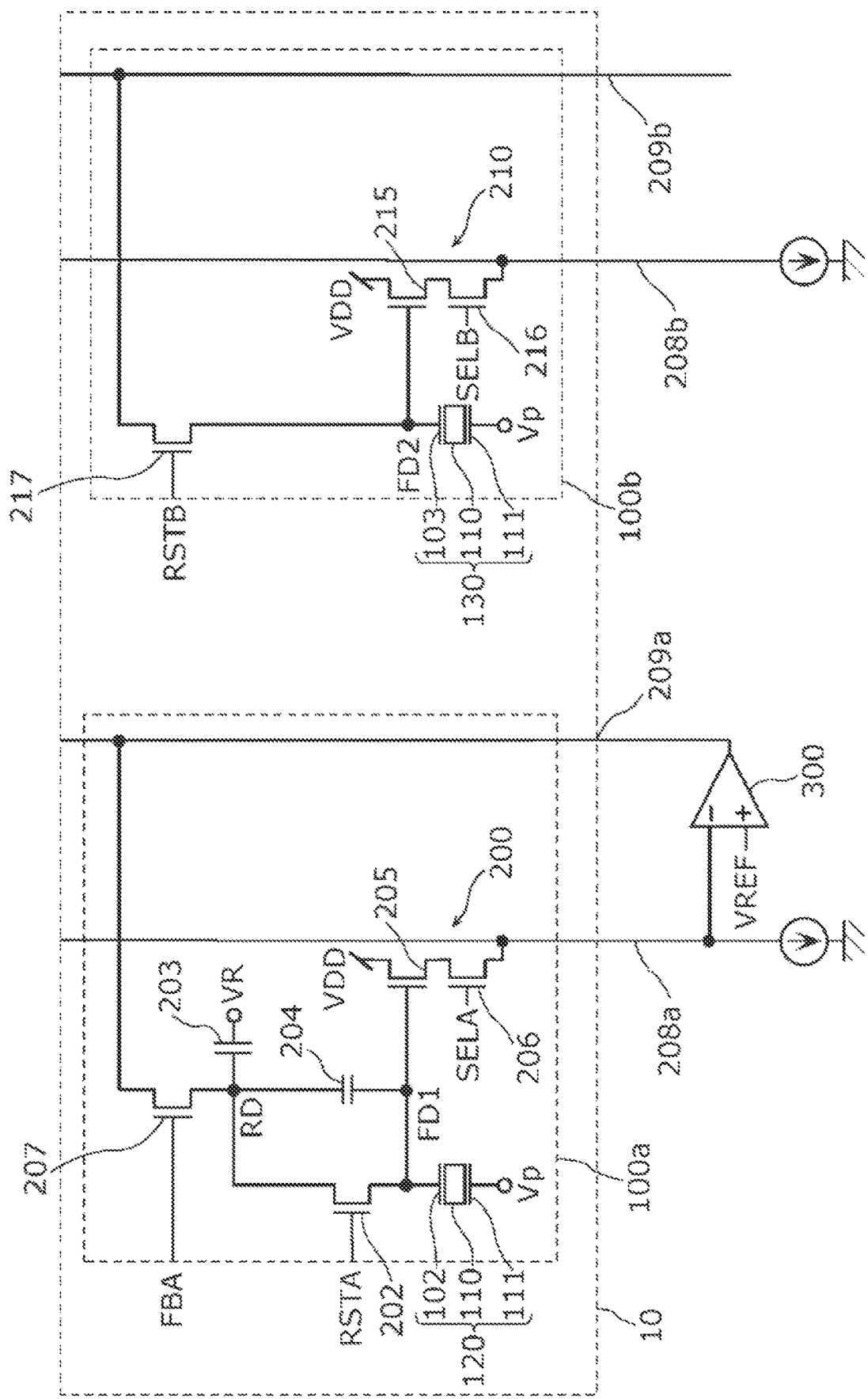
FIG. 2 is a diagram showing an example of a pixel circuit configuration according to the first embodiment.

FIG. 2 is a diagram showing an example of a circuit configuration of the pixel 10 according to the present embodiment. The pixel 10 includes a first imaging cell 100a with a high sensitivity and a second imaging cell 100b with a sensitivity lower than that of the first imaging cell 100a in the same pixel. The ratio of the sensitivity of the first imaging cell 100a to the sensitivity of the second imaging cell 100b is larger than 1. The sensitivity ratio may be defined, for example, such that when light with the same intensity is incident on both the first imaging cell 100a and the second imaging cell 100b for the same time period, the sensitivity ratio is given by the ratio of an accumulated amount of signal charge to the signal charge saturation capacity of the first imaging cell 100a to the ratio of an accumulated amount of signal charge to the signal charge saturation capacity of the second imaging cell 100b.

The first imaging cell 100a functions as a low noise cell for imaging in a low illuminance circumstance. As will be described below, by using the first imaging cell 100a and the second imaging cell 100b, it becomes possible to easily capture an image of a scene with a wider dynamic range. The first imaging cell 100a includes a first photoelectric conversion unit 120 that converts light into an electric signal and a first detection circuit 200 that is electrically connected to the first photoelectric conversion unit 120 and reads out the electric signal generated by the first photoelectric conversion unit 120.

The first photoelectric conversion unit 120 generates an electric signal corresponding to light incident on the photosensitive region. The first photoelectric conversion unit 120 includes a photoelectric conversion layer 110 formed of, for example, an organic material or an inorganic material such as amorphous silicon. The photoelectric conversion layer 110 generates, for example, a hole-electron pair by a photoelectric conversion. In the following description, it is assumed by way of example that the first photoelectric conversion unit 120 is configured in a multilayer structure including the photoelectric conversion layer 110.

The first photoelectric conversion unit 120 is formed on a substrate such as a semiconductor substrate on which a first amplification transistor 205 is disposed. The first photoelectric conversion unit 120 includes a first pixel electrode 102, a counter electrode 111, and a photoelectric conversion layer 110 disposed between the first pixel electrode 102 and the counter electrode 111. For example, one first pixel electrode 102 and one second pixel electrode 103, which will be described later, are provided for each of a plurality of pixels 10. For example, two pixels 10 adjacent to each other are electrically isolated by providing a gap between first pixel electrodes 102 of the respective two pixels 10 and a gap between second pixel electrodes 103 of the respective two pixels 10. Note that the first pixel electrode 102 is also electrically isolated from the second pixel electrode 103. The first pixel electrode 102 has a connection with a charge storage node FD1. The charge storage node is also referred to as a "floating diffusion node". In the present description, the charge storage node FD1 is a part of a first charge storage region that stores the signal charge collected by the first pixel electrode 102. The first charge storage region includes at least a part of an electrode, a transistor, and a capacitive element connected to the charge storage node FD1.

The counter electrode 111 is an electrode disposed on the light receiving surface side of the photoelectric conversion layer 110, and is formed of a transparent conductive material such as ITO (Indium Tin Oxide). In the operation of the imaging device 1, a predetermined voltage Vp is applied to the counter electrode 111. The counter electrode 111 and the photoelectric conversion layer 110 may be formed in common for all the pixels 10, or may be formed in common for each pixel block including several pixels 10. The counter electrode 111 and the photoelectric conversion layer 110 may be formed in common for the first imaging cell 100a and the second imaging cell 100b, or may be formed individually for the first imaging cell 100a and the second imaging cell 100b.

By applying a voltage Vp to the counter electrode 111, the holes or electrons of the hole-electron pairs generated in the photoelectric conversion layer 110 via the photoelectric conversion can be collected by the first pixel electrode 102. When holes are used as signal charges, for example, a voltage of 10 V or similar to that may be applied as the voltage Vp to the counter electrode 111. By setting the potential of the counter electrode 111 top be higher than the potential of the first pixel electrode 102, holes can be accumulated in the charge storage node FD1. In the following description, it is assumed by way of example that holes are used as signal charges. Note that electrons may be used as signal charges. In this case, the potential of the counter electrode 111 is to be lower than that of the first pixel electrode 102.

As the voltage Vp, a common voltage may be supplied to each of all the pixels 10, or voltages may be supplied to pixels blocks each including a certain number of pixels 10, for example, such that voltages supplied to pixels 10 in the same pixel block are equal while the voltages may be different among different pixel blocks. By supplying different voltages to the pixel blocks, it is possible to change the sensitivity of each pixel 10. As the voltage Vp, a common voltage may be supplied to the first imaging cell 100a and the second imaging cell 100b, or different voltages may be supplied to the first imaging cell 100a and the second imaging cell 100b, respectively.

A control terminal of the first amplification transistor 205 is connected to the charge storage node FD1. The control terminal is, for example, a gate.

The first detection circuit 200 includes the first amplification transistor 205, a first selection transistor 206, a first reset transistor 202, and a feedback circuit.

Hereinafter, unless otherwise specified, it is assumed by way of example that an N-channel MOSFET (Metal Oxide Semiconductor Field Effect Transistor) is used as each transistor. Note that the semiconductor substrate is not limited to a substrate the entire of which is a semiconductor. The semiconductor substrate may be a substrate configured such that a semiconductor layer is formed on a side, where the photosensitive region is provided, of an insulating substrate.

The gate of the first amplification transistor 205 is connected to the first photoelectric conversion unit 120. The first amplification transistor 205 amplifies the electric signal generated by the first photoelectric conversion unit 120. One of a source and a drain of the first amplification transistor 205 is connected to one of a source and a drain of the first selection transistor 206. The other one of the source and the drain of the first amplification transistor 205 is connected to a power supply line that supplies a power supply voltage VDD.

One of the source and the drain of the first selection transistor 206 is connected to one of the source and the drain of the first amplification transistor 205. The other one of the source and the drain of the first selection transistor 206 is connected to a vertical signal line 208a. The vertical signal line 208a corresponds to the vertical signal line SIGjA in FIG. 1. The gate of the first selection transistor 206 is controlled by a voltage of an address control line SELA having a connection with the row scanning circuit 310. The first selection transistor 206 selectively outputs a signal amplified by the first amplification transistor 205.

One of a source and a drain of the first reset transistor 202 is connected to the charge storage node FD1. The other one of the source and the drain of the first reset transistor 202 is connected to a node RD. The node RD is a node connected to each of a bandwidth control transistor 207, a first capacitive element 203, and a second capacitive element 204. The gate of the first reset transistor 202 is controlled by a voltage of a reset control line RSTA. The reset control line RSTA corresponds to the reset control line RSTiA in FIG. 1. The first reset transistor 202 resets (in other words, initializes) the charge storage node FD1 connected to the first pixel electrode 102 of the first photoelectric conversion unit 120.

One of the source and the drain of the bandwidth control transistor 207 is connected to the node RD. The other one of the source and the drain of the bandwidth control transistor 207 is connected to a feedback line 209a. The gate of the bandwidth control transistor 207 is controlled by the voltage of the feedback control line FBA. The feedback control line FBA corresponds to the feedback control line FBi in FIG. 1. The bandwidth control transistor 207 controls the bandwidth of the feedback circuit. The bandwidth control transistor 207 is disposed on the feedback path and is connected to an output of an inverting amplifier 300 via the feedback line 209a. A reference voltage VREF is applied to one of two inputs of the inverting amplifier 300, and the other one of the two inputs is connected to the vertical signal line 208a.

The second capacitive element 204 is electrically connected between the charge storage node FD1 and one of the source and the drain of the bandwidth control transistor 207. The first capacitance element 203 has a capacitance value larger than that of the second capacitive element 204, and is connected between the second capacitive element 204 and the reference voltage VR. The first capacitive element 203 and the second capacitive element 204 are each, for example, a MOM (Metal-Oxide-Metal) capacitor, a MIM (Metal-Insulator-Metal) capacitor, a MOS (Metal-Oxide Semiconductor) capacitor, or a trench capacitor.

The feedback circuit includes the inverting amplifier 300 and forms a feedback path for negative feedback of kTC noise that occurs when the first reset transistor 202 is turned off. The provision of the inverting amplifier 300 makes it possible to increase the gain of the feedback path and improve the noise suppression effect.

The second imaging cell 100b functions as a high-saturation cell. The "high saturation" means that the signal charge can be accumulated up to a high saturation level. That is, the amount of charge that can be stored without saturation in the second imaging cell 100b is larger than that in the first imaging cell 100a due to at least one of following features: 1) the amount of collected signal charge is small; and 2) the capacity of storing the signal charge is large. Therefore, the sensitivity of the second imaging cell 100b is lower than the sensitivity of the first imaging cell 100a.

The second imaging cell 100a includes a second photoelectric conversion unit 130 that converts light into an electric signal and a second detection circuit 210 that is electrically connected to the second photoelectric conversion unit 130 and reads out the electric signal generated by the second photoelectric conversion unit 130. Of the constituent elements of the second imaging cell 100b, descriptions of constituent elements having similar functions to those of the first imaging cell 100a will be omitted or simplified.

Like the first photoelectric conversion unit 120, the second photoelectric conversion unit 130 generates an electric signal using the light incident on the photosensitive region.

The second photoelectric conversion unit 130 is formed, for example, on a substrate such as a semiconductor substrate, like the first photoelectric conversion unit 120. The second photoelectric conversion unit 130 includes a second pixel electrode 103, the counter electrode 111, and the photoelectric conversion layer 110 disposed between the second pixel electrode 103 and the counter electrode 111. The second pixel electrode 103 has a connection with the charge storage node FD2. In the present description, the charge storage node FD2 is a part of the second charge storage region that stores the signal charge collected by the second pixel electrode 103. The second charge storage region includes at least a part of an electrode, a transistor, and a capacitive element connected to the charge storage node FD2.

The second detection circuit 210 includes a second amplification transistor 215, a second selection transistor 216, and a second reset transistor 217.

The gate of the second amplification transistor 215 is connected to the second photoelectric conversion unit 130. The second amplification transistor 215 amplifies the electric signal generated by the second photoelectric conversion unit 130. One of the source and the drain of the second selection transistor 216 is connected to one of the source and the drain of the second amplification transistor 215.

The other one of the source and the drain of the second selection transistor 216 is connected to a vertical signal line 208b. The vertical signal line 208b corresponds to the vertical signal line SIGjB in FIG. 1. The gate of the second selection transistor 216 is controlled by a voltage of an address control line SELB having a connection with the row scanning circuit 310. The second selection transistor 216 selectively outputs the signal amplified by the second amplification transistor 215.

One of the source and the drain of the second reset transistor 217 is connected to the charge storage node FD2. The other one of the source and the drain of the second reset transistor 217 is connected to a reset line 209b. The gate of the second reset transistor 217 is controlled by a voltage of a reset control line RSTB. The reset control line RSTB corresponds to the reset control line RSTiB in FIG. 1. The second reset transistor 217 resets (in other words, initializes) the charge storage node FD2 connected to the second pixel electrode 103 of the second photoelectric conversion unit 130.

The first imaging cell 100a is responsible for imaging a dark scene, and thus it has a low noise characteristic, but it does not necessarily need to have a high saturation characteristic. On the other hand, the second imaging cell 100b is responsible for imaging a bright scene and thus it has a high saturation characteristic. However, in imaging a bright scene, a large amount of light is incident on the imaging device 1, and thus the imaging characteristic is determined by shot noise and the second imaging cell 100b does not necessarily need to have a low noise characteristic.

The first imaging cell 100a includes the feedback circuit, which makes it possible to significantly suppress noise that occurs when the first reset transistor 202 is turned off.

Like the first imaging cell 100a, an inverting amplifier may be provided in the second imaging cell 100b and the output of the inverting amplifier may be connected to the reset line 209b, that is, a feedback circuit may be provided in the second imaging cell 100b thereby making it possible to reduce noise in the second imaging cell 100b.

Figure 3:
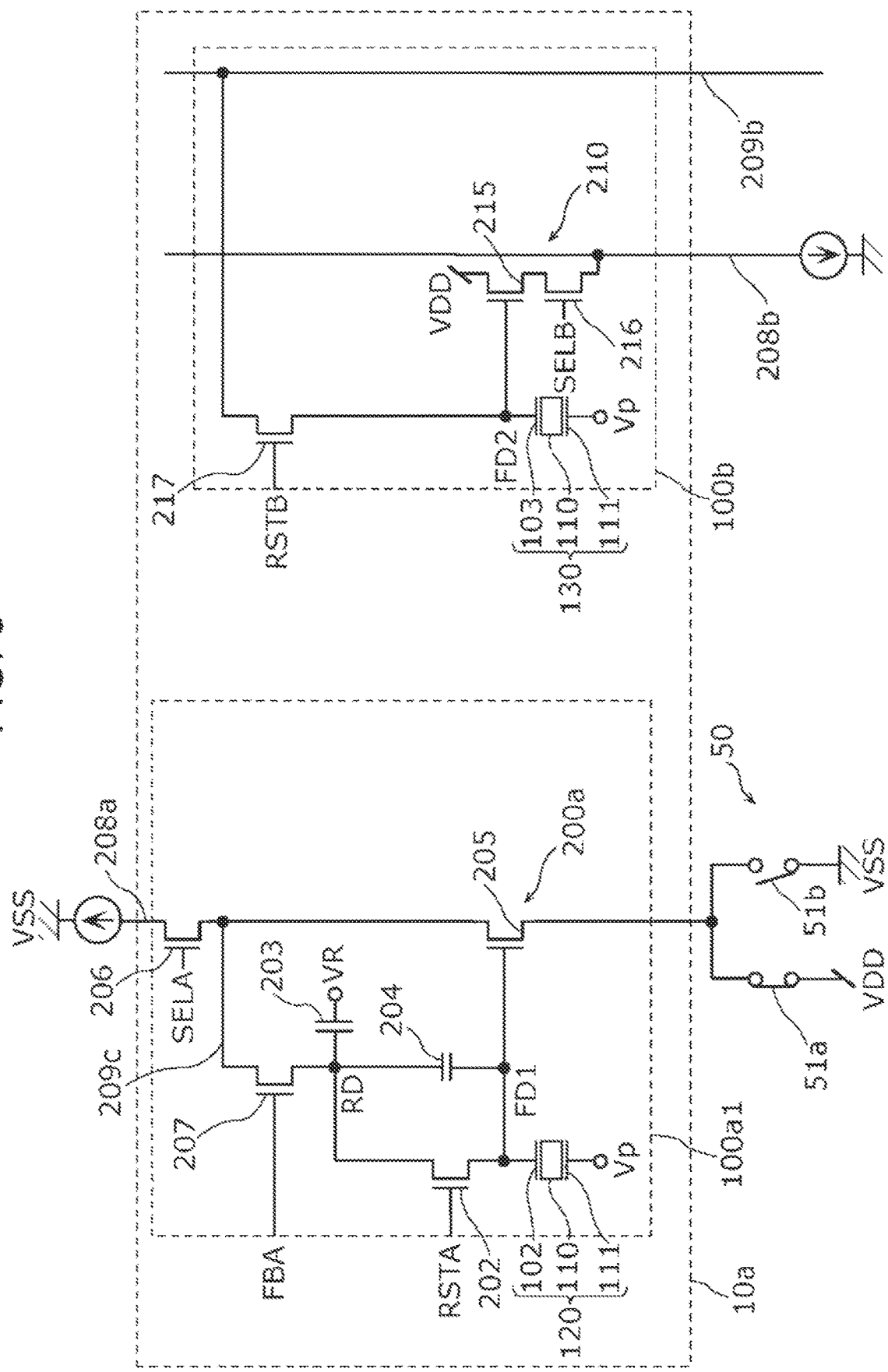
FIG. 3 is a diagram showing another example of a pixel circuit configuration according to the first embodiment.

The circuit configuration of the pixel 10 is not limited to the example shown in FIG. 2. For example, a feedback circuit is formed in the pixel. FIG. 3 is a diagram showing another example of a circuit configuration of a pixel according to the present embodiment. The imaging device 1 according to the present embodiment may include pixels 10a instead of pixels 10. In contrast to the pixel 10 including the first imaging cell 100a including the first detection circuit 200, the pixel 10a shown in FIG. 3 includes a first imaging cell 100a1 including a first detection circuit 200a.

In the first detection circuit 200a of the first imaging cell 100a1, the other one of the source and the drain of the bandwidth control transistor 207 is connected to the first amplification transistor 205 and the first selection transistor 206 via a feedback line 209c. The other one of the source and the drain of the first amplification transistor 205 is connected to one end of a switch element 51a and one end of a switch element 51b included in a switching circuit 50. The other end of the switch element 51a is connected to the power supply voltage VDD. The other end of the switch element 51b is connected to the reference potential VSS.

By providing the feedback circuit in the pixel in the above-described manner, it also becomes possible for the first imaging cell 100a1 to suppress noise which occurs when the first reset transistor 202 is turned off. Details of noise suppression using a feedback circuit are described in Japanese Unexamined Patent Application Publication No. 2017-46333. All contents disclosed in Japanese Unexamined Patent Application Publication No. 2017-46333 are incorporated herein by reference.

Another circuit configuration such as that disclosed in Japanese Unexamined Patent Application Publication No. 2017-135696 may be employed for the pixel 10.

Figure 4:
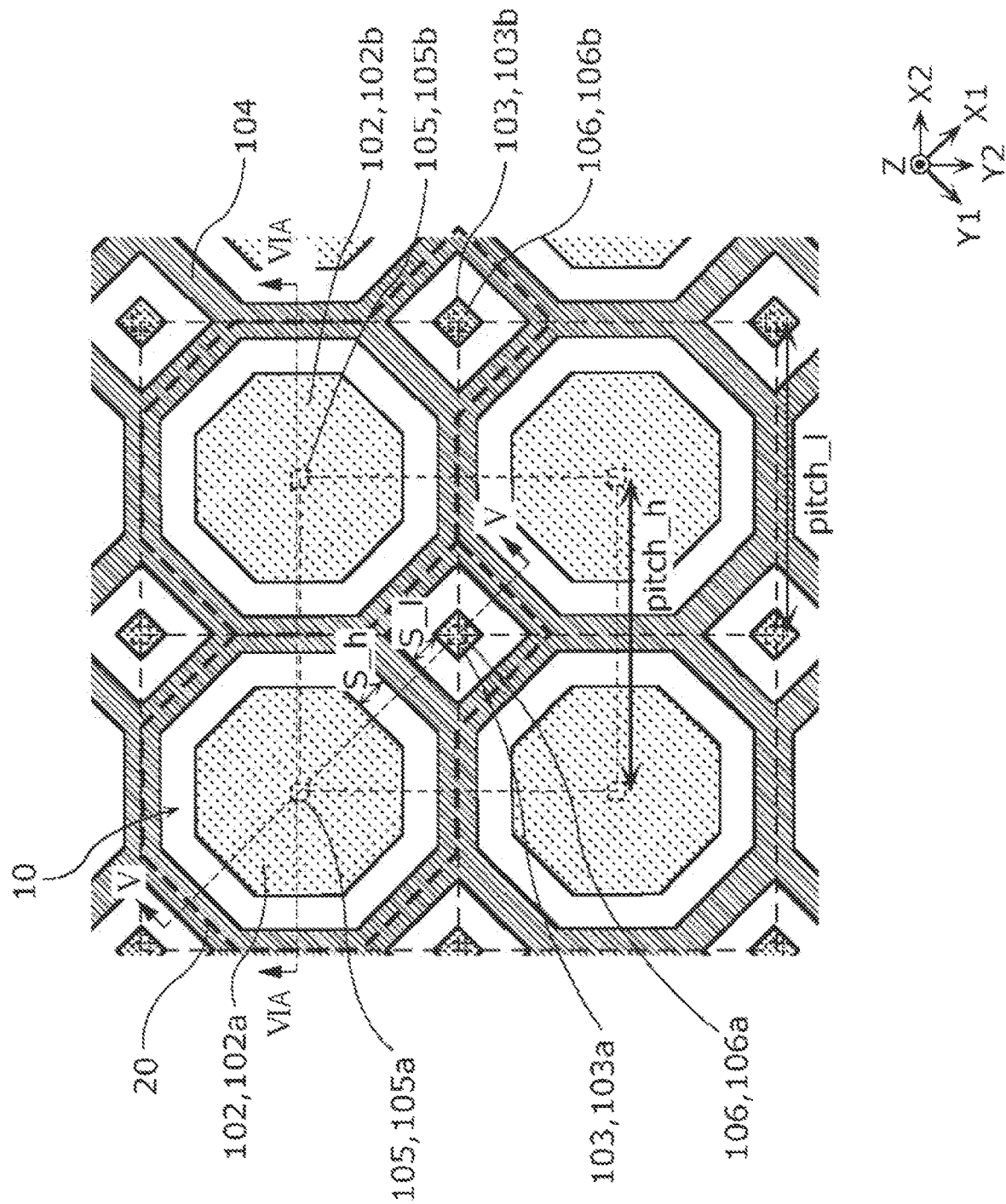
FIG. 4 is a plan view showing an example of a pixel electrode layout according to the first embodiment.

Next, a layout of a plurality of pixel electrodes provided on the imaging device 1 is described below. FIG. 4 is a plan view showing an example of an electrode layout of the pixel 10. More specifically, the plan view in FIG. 4 shows a seen-through view of constituent elements located above (in other words, located at more positive positions in the Z-axis direction than) the first pixel electrode 102, the second pixel electrode 103, and the auxiliary electrode 104. This also applies to plan views showing the electrode layouts described below.

A pixel electrode region 20 shown in FIG. 4 corresponds to the pixel 10 including the first imaging cell 100a and the second imaging cell 100b shown in FIG. 2. In the pixel electrode region 20, the first pixel electrode 102, the second pixel electrode 103, and the auxiliary electrode 104 are provided. Hereinafter, in order to distinguish between two first pixel electrodes 102 respectively provided in two adjacent pixels 10, these two first pixel electrodes 102 will be referred to, as required, as a first pixel electrode 102a and a first pixel electrode 102b. Similarly, two second pixel electrodes 103 respectively provided in adjacent two pixels 10 will be referred to, as required, as a second pixel electrode 103a and a second pixel electrode 103b.

Each pixel 10 includes one set of one first pixel electrode 102 included in one first imaging cell 100a and one second pixel electrode 103 included in one second imaging cell 100b, and one auxiliary electrode 104. Thus, the plurality of pixel electrodes provided in the imaging device 1 include a plurality of sets each including one first pixel electrode 102 included in one first imaging cell 100a and one second pixel electrode 103 included in one second imaging cell 100b. In the present description, one set refers to, for example, one first pixel electrode 102 and one second pixel electrode 103 provided in one pixel 10. For example, a first pixel electrode 102 and a second pixel electrode 103 in a certain pixel 10 can be read as a first pixel electrode 102 and a second pixel electrode 103 in a certain set.

As shown in FIG. 4, a common auxiliary electrode 104 is provided around the first pixel electrode 102 and the second pixel electrode 103a provided in each pixel electrode region 20. The auxiliary electrode 104 is commonly included in the first imaging cell 100a and the second imaging cell 100b. The auxiliary electrode 104 is located between the first pixel electrode 102a and the second pixel electrode 103a. In plan view, for example, only one auxiliary electrode 104 is disposed between the first pixel electrode 102a and the second pixel electrode 103a. In plan view, for example, the first pixel electrode 102a and the second pixel electrode 103a are each surrounded by one common auxiliary electrode 104.

The auxiliary electrode 104 is also provided commonly for adjacent pixel electrode regions 20. The auxiliary electrode 104 is commonly included in adjacent pixels 10. The auxiliary electrode 104 may be formed in common for all pixels 10, or may be formed for each pixel block including a certain number of pixels 10. For example, only one auxiliary electrode 104 is commonly included in pixels 10 adjacent to each other. In plan view, the auxiliary electrode 104 is located between the first pixel electrode 102a and the first pixel electrode 102b provided in the respective adjacent pixels 10. The auxiliary electrode 104 is also located, in plan view, between the second pixel electrode 103a and the second pixel electrode 103b provided in the respective adjacent pixels 10. The auxiliary electrode 104 is also located between the first pixel electrode 102b provided in one of the adjacent pixels 10 and the second pixel electrode 103a provided in the other one of the adjacent pixels 10.

For example, the auxiliary electrode 104 is connected to a voltage supply circuit or ground (not shown) and is held at a predetermined potential. The auxiliary electrode 104, the first pixel electrode 102, and the second pixel electrode 103 are electrically isolated from each other. As described above, when holes are used as the signal charges, the signal charges can be attracted to the auxiliary electrode 104 when the potential of the auxiliary electrode 104 is set to be lower than the potential of the counter electrode 111. Therefore, by providing the auxiliary electrode 104 between the adjacent pixels, it is possible to suppress color mixing between the adjacent pixels. The potential of the auxiliary electrode 104 is set to, for example, a fixed potential, but it may be variable.

A first electrode plug 105 for electrically connecting the first pixel electrode 102 to the charge storage node FD1 is connected to the first pixel electrode 102. A corresponding first electrode plug 105 is connected to the first pixel electrode 102 provided in each of the plurality of pixels 10. In plan view, for example, the first electrode plug 105 is located at the center of the corresponding first pixel electrode 102. A second electrode plug 106 for electrically connecting the second pixel electrode 103 to the charge storage node FD2 is connected to the second pixel electrode 103. A corresponding second electrode plug 106 is connected to the second pixel electrode 103 provided in each of the plurality of pixels 10. In plan view, for example, the second electrode plug 106 is located at the center of the corresponding second pixel electrode 103.

In the following description, in order to distinguish between the two first electrode plugs 105 connected to the respective first pixel electrodes 102 adjacent to each other, the two first electrode plugs 105 will also be referred to, as required, to a first electrode plug 105a and a first electrode plug 105b. Similarly, the two second electrode plugs 106 connected to the respective second pixel electrodes 103 adjacent to each other will also be referred to, as required, as a second electrode plug 106a and a second electrode plug 106b.

The first pixel electrodes 102 are arranged in an array such that the centers of the respective first pixel electrodes 102 form a square lattice with a pitch of pitch_h. That is, in plan view, the first pixel electrodes 102 included in the respective pixels 10 are located on the lattice points of a first square lattice composed of unit lattices with each side measuring pitch_h.

The second pixel electrodes 103 are arranged in an array such that the centers of the respective second pixel electrodes 103 form a square lattice with a pitch of pitch_l. That is, in plan view, the second pixel electrodes 103 included in the respective pixels 10 are located on the lattice points of, not the first square lattice, but a second square lattice composed of unit lattices with each side measuring pitch_l.

In FIG. 4, the pitch pitch_h is equal to the pitch pitch_l. In this case, the resolution of the first imaging cells 100a including the first pixel electrodes 102 is the same as the resolution of the second imaging cells 100b including the second pixel electrodes 103. Therefore, the imaging device 1 can realize a wide dynamic range in imaging without deteriorating the resolution.

In each of the plurality of pixels 10, when the distance between the first pixel electrode 102 (for example, the first pixel electrode 102a) and the auxiliary electrode 104 is equal to a distance S_h, and the distance between the second pixel electrode 103 (for example, the second pixel electrode 103a included in the same pixel 10 in which the first pixel electrode 102a is included) and the auxiliary electrode 104 is equal to a distance S_l, the distance S_h and the distance S_l are equal to each other in FIG. 4.

The distance S_h is the average value of the distances between the first pixel electrodes 102 and the auxiliary electrodes 104 that are adjacent to each other in plan view. For example, this average value of the distances may be given such that a shortest distance, as seen in plan view, from a point on an outer edge of the first pixel electrode 102 to the auxiliary electrode 104 is determined for each of all points on the outer edge of the first pixel electrode 102, and the average value of the shortest distances taken for all points along the outer edge is employed as the average value of interest. The distance S_l is the average value of the distances, as seen in plan view, of the gaps between the second pixel electrodes 103 and the auxiliary electrode 104 adjacent to each other. For example, this average value of the distances may be given such that a shortest distance, as seen in plan view, from a point on an outer edge of the second pixel electrode 103 to the auxiliary electrode 104 is determined for each of all points on the outer edge of the second pixel electrode 103, and the average value of the shortest distances taken for all points along the outer edge is employed as the average value. In a case where the first pixel electrode 102 and the auxiliary electrode 104 adjacent to each other are separated from each other by a constant interval as shown in FIG. 4, the distance S_h is equal to the distance of the gap, as seen in plan view, from the first pixel electrode 102 to the auxiliary electrode 104 in each pixel 10, that is, the shortest distance between the edge of the first pixel electrode 102 and the edge of the auxiliary electrode 104. In a case where the second pixel electrode 103 and the auxiliary electrode 104 adjacent to each other are separated from each other by a constant interval as shown in FIG. 4, the distance S_l is equal to the distance of the gap, as seen in plan view, from the second pixel electrode 103 to the auxiliary electrode 104 in each pixel 10, that is, the shortest distance between the edge of the second pixel electrode 103 and the edge of the auxiliary electrode 104.

In each of the plurality of pixels 10, the distance S_h may be different from the distance S_l. This makes it possible, as will be described in further detail later, to change the sensitivities of the first imaging cell 100a and the second imaging cell 100b. By properly adjusting the relationship in term of the distance S_h and the distance S_l, it is possible to expand the dynamic range. Furthermore, an increase is obtained in the degree of freedom in the layout of the first pixel electrodes 102, the second pixel electrodes 103, and the auxiliary electrodes 104, and thus it becomes easy to produce the electrodes.

In plan view, in each of the plurality of pixels 10, the area of the first pixel electrode 102 is larger than the area of the second pixel electrode 103. Therefore, the first pixel electrode 102 has a higher ability to collect the signal charge generated in the photoelectric conversion layer 110 than the second pixel electrode 103. Thus, the first imaging cell 100a having the first pixel electrode 102 can have a higher sensitivity than the second imaging cell 100b having the second pixel electrode 103.

Figure 5:
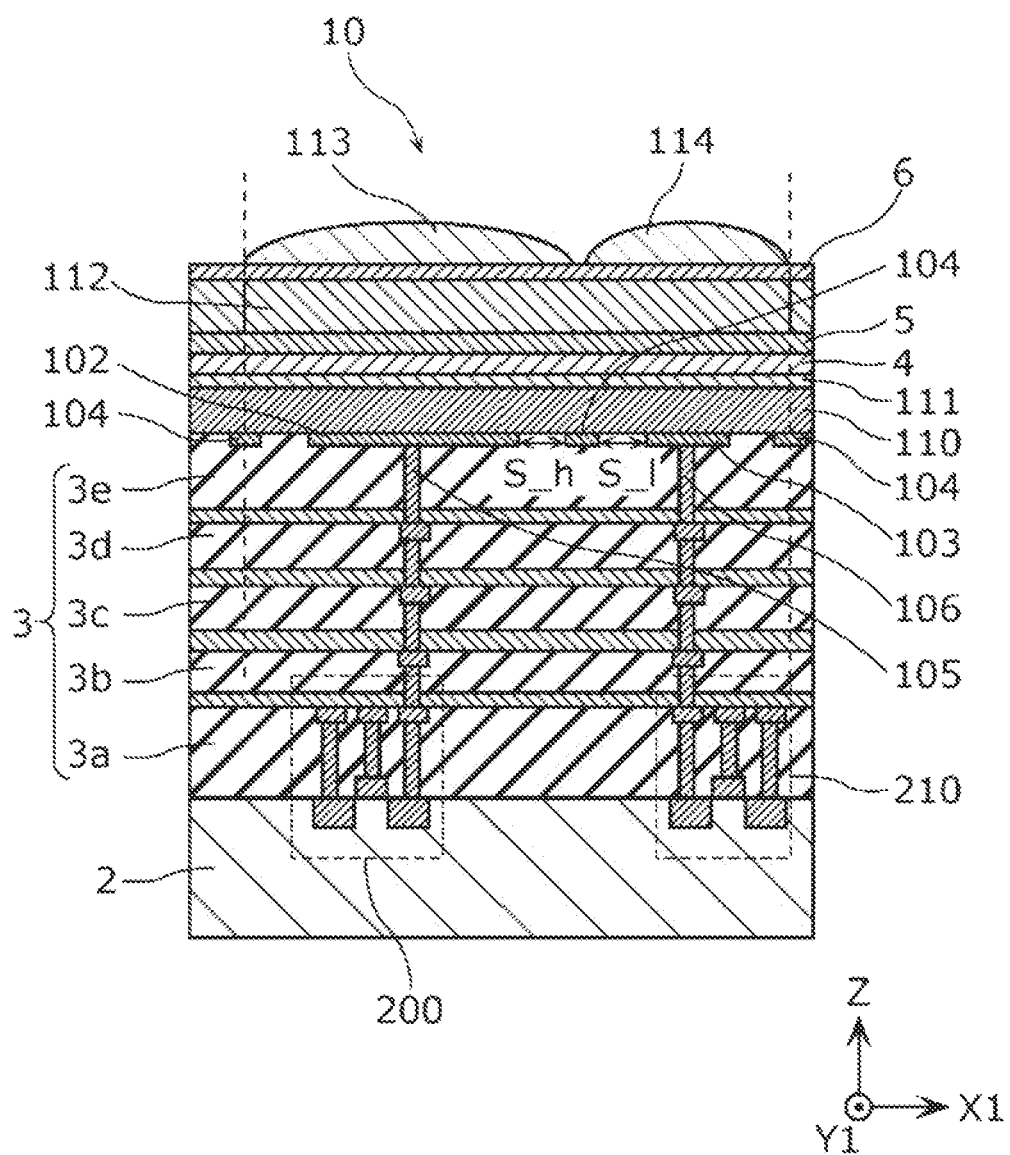
FIG. 5 is a schematic cross-sectional view of a pixel taken along line V-V of FIG. 4 according to the first embodiment.

Next, a cross-sectional structure of the pixel 10 is described below. FIG. 5 is a schematic cross-sectional view of the pixel 10 taken along line V-V of FIG. 4. The imaging device 1 includes a semiconductor substrate 2, an insulating layer 3 disposed on the semiconductor substrate 2, and a pixel array 30 including a plurality of pixels 10 formed on the semiconductor substrate 2. FIG. 5 mainly shows a cross section of one pixel 10 included in the imaging device 1. As shown in FIG. 1, in the imaging device 1, the pixel 10 includes a first pixel electrode 102, a second pixel electrode 103, an auxiliary electrode 104, a counter electrode 111 opposing the first pixel electrode 102, the second pixel electrode 103, and the auxiliary electrode 104, a photoelectric conversion layer 110 formed between the counter electrode and the electrodes including the first pixel electrode 102, the second pixel electrode 103, and the auxiliary electrode 104, a first detection circuit 200 which is located on the semiconductor substrate 2 and detects the potential of the first pixel electrode 102, and a second detection circuit 210 that detects the potential of the second pixel electrode 103. The pixel 10 further includes a first electrode plug 105 and a second electrode plug 106. Furthermore, the pixel 10 also includes a buffer layer 4, a sealing layer 5, a color filter 112, a planarization layer 6, a first microlens 113, and a second microlens 114.

The first detection circuit 200 and the second detection circuit 210 are formed across an interface between the semiconductor substrate 2 and an insulating layer 3. The first pixel electrode 102, the second pixel electrode 103, and the auxiliary electrode 104 are formed on a main surface, which is one of two main surfaces located at a more positive position in the Z-axis direction, of the insulating layer 3, that is, on an upper main surface. In the present specification, the upper direction is defined by the positive direction along the Z axis. The first pixel electrode 102 is connected to the corresponding first detection circuit 200 via the first electrode plug 105. The second pixel electrode 103 is connected to the corresponding second detection circuit 210 via the second electrode plug 106.

The first pixel electrode 102, the second pixel electrode 103, and the auxiliary electrode 104 are electrodes for collecting the signal charge generated in the photoelectric conversion layer 110. The first pixel electrode 102, the second pixel electrode 103, and the auxiliary electrode 104 oppose the counter electrode 111 via the photoelectric conversion layer 110. The auxiliary electrode 104 collects a signal charge generated in the photoelectric conversion layer 110 in an area which is located, as seen in plan view, between the first pixel electrode 102 and the second pixel electrode 103 adjacent to each other via the auxiliary electrode 104, between two first pixel electrodes 102 adjacent to each other via the auxiliary electrode 104, or between two second pixel electrodes 103 adjacent to each other via the auxiliary electrode 104.

The first pixel electrode 102, the second pixel electrode 103, and the auxiliary electrode 104 are each made of a metal material such as titanium nitride (TiN). The first pixel electrode 102, the second pixel electrode 103, and the auxiliary electrode 104 each may be made of copper (Cu), tungsten (W), titanium (Ti), tantalum (Ta), aluminum (Al), or a compound thereof. The first pixel electrode 102, the second pixel electrode 103, and the auxiliary electrode 104 each have a uniform film thickness, and the upper surfaces of the first pixel electrode 102, the second pixel electrode 103, and the auxiliary electrode 104 are planarized. A constituent layer 3e constituting the insulating layer 3 is disposed in a gap between the first pixel electrode 102 and the auxiliary electrode 104 adjacent to each other and a gap between the second pixel electrode 103 and the auxiliary electrode 104 adjacent to each other.

One first detection circuit 200 is provided for each corresponding one of the plurality of first pixel electrodes 102. One second detection circuit 210 is provided for each corresponding one of the plurality of second pixel electrodes 103. The first detection circuit 200 detects the signal charge collected by the corresponding first pixel electrode 102 and outputs the signal voltage corresponding to the charge. The second detection circuit 210 detects the signal charge collected by the corresponding second pixel electrode 103, and outputs the signal voltage corresponding to the charge. The first detection circuit 200 and the second detection circuit 210 are realized using, for example, a MOS circuit or a TFT (Thin Film Transistor) circuit. The first detection circuit 200 includes, for example, the first amplification transistor 205 whose gate is connected to the first pixel electrode 102, and the first amplification transistor 205 outputs a signal voltage corresponding to the amount of signal charge. The second detection circuit 210 includes, for example, the second amplification transistor 215 whose gate is connected to the second pixel electrode 103, and the second amplification transistor 215 outputs a signal voltage according to the amount of signal charge.

The first electrode plug 105 electrically connects the first pixel electrode 102 and the corresponding first detection circuit 200 in each pixel 10. The first electrode plug 105 is connected to, on the side opposite to the photoelectric conversion layer 110, the first pixel electrode 102. The second electrode plug 106 electrically connects the second pixel electrode 103 to the corresponding second detection circuit 210 in each pixel 10. The second electrode plug 106 is connected to, on the side opposite to the photoelectric conversion layer 110, the second pixel electrode 103. The first electrode plug 105 and the second electrode plug 106 are each formed by embedding a conductive material such as copper (Cu) or tungsten (W) in the insulating layer 3.

The semiconductor substrate 2 is made of, for example, silicon (Si) or the like.

The insulating layer 3 is formed on the semiconductor substrate 2 and includes a plurality of constituent layers 3a, 3b, 3c, 3d, and 3e. Hereinafter, the plurality of constituent layers 3a, 3b, 3c, 3d, and 3e may be referred to as a plurality of constituent layers 3a to 3e. The plurality of constituent layers 3a to 3e are each made of an insulating material such as silicon dioxide (SiO2). A wiring layer including a contact plug, a wiring, and the like is disposed in each of the plurality of constituent layers 3a to 3e. The number of constituent layers included in the insulating layer 3 can be arbitrarily set, and is not limited to the example shown in FIG. 5 in which there are five constituent layers 3a to 3e. An insulating film made of an insulating material different from that of the plurality of constituent layers 3a to 3e may be disposed between some of the plurality of constituent layers 3a to 3e.

The photoelectric conversion layer 110 is disposed as a layer formed on the upper surface of the constituent layer 3e in which the first pixel electrode 102, the second pixel electrode 103, and the auxiliary electrode 104 are embedded. On the upper surface of the photoelectric conversion layer 110, the counter electrode 111, the buffer layer 4, and the sealing layer 5 are laminated in this order.

The photoelectric conversion layer 110 is a layer made of a photoelectric conversion material that generates a signal charge according to the intensity of received light. That is, the photoelectric conversion layer 110 converts light into a signal charge. The photoelectric conversion layer 110 is located between the counter electrode 111 and the electrodes including the first pixel electrode 102, the second pixel electrode 103, and the auxiliary electrode 104, and the counter electrode 111. The photoelectric conversion material is, for example, an organic semiconductor material, and includes at least one of a p-type organic semiconductor and an n-type organic semiconductor. The photoelectric conversion layer 110 is commonly formed, for example, in the pixel array 30, and has a uniform film thickness.

The counter electrode 111 is an electrode opposing the first pixel electrode 102, the second pixel electrode 103, and the auxiliary electrode 104.

In the present embodiment, the counter electrode 111 is disposed on the side, where light is incident, of the imaging device 1. The counter electrode 111 may be transparent to allow light to be incident on the photoelectric conversion layer 110. The material of the counter electrode 111 may be, for example, a transparent oxide conductive material such as ITO (Indium Tin Oxide) or IZO (Indium Zinc Oxide).

The color filter 112 having a transmission wavelength range corresponding to each pixel 10 is laminated on the upper surface of the sealing layer 5. For example, the color filter 112 is provided individually for each pixel 10 at a location corresponding to each pixel 10. For example, the color filter 112 having a transmission wavelength range corresponding to each pixel 10 is shared by the first imaging cell 100a and the second imaging cell 100b included in the pixel 10.

Furthermore, the planarization layer 6 is laminated on the upper surface of the color filter 112. On the upper surface of the planarization layer 6, the first microlens 113 and the second microlens 114 are disposed at locations respectively corresponding to the first pixel electrode 102 and the second pixel electrode 103.

The first microlens 113 opposes the photoelectric conversion layer 110 via the counter electrode 111, and is located, as seen in plan view, so as to overlap the corresponding first pixel electrode 102. For example, in plan view, the center of the first microlens 113 is coincident with the center of the corresponding first pixel electrode 102. The first microlens 113 collects incident light in a region overlapping, in plan view, the corresponding first pixel electrode 102.

The second microlens 114 opposes the photoelectric conversion layer 110 via the counter electrode 111, and is located, as seen in plan view, so as to overlap the corresponding second pixel electrode 103. For example, in plan view, the center of the second microlens 114 is coincident with the center of the corresponding second pixel electrode 103. The second microlens 114 collects incident light in a region overlapping, in plan view, the corresponding second pixel electrode 103. The second microlens 114 collects incident light in a region overlapping, in plan view, the corresponding second pixel electrode 103.

The light collecting area of the first microlens 113 is larger than the light collecting area of the second microlens 114. This makes it easy for the first imaging cell 100a having the first pixel electrode 102 to have a higher sensitivity than the second imaging cell 100b having the second pixel electrode 103, and thus it is possible to have a large ratio of the sensitivity of the first imaging cell 100a to the sensitivity of the second imaging cell 100b.

The imaging device 1 described above can be produced by using a general semiconductor device fabrication process. In particular, in a case where a silicon substrate is used as the semiconductor substrate 2, the imaging device 1 can be produced using various silicon semiconductor device fabrication processes.

Next, effects of suppressing color mixing by the auxiliary electrode 104 are described. FIG. 6A is a schematic cross-sectional view of pixels 10 taken along line VIA-VIA of FIG. 4. In FIG. 6A, a cross section is shown across two adjacent pixels 10. In FIG. 6A, illustration is simplified and only the first pixel electrodes 102a and 102b, the auxiliary electrode 104, the first electrode plugs 105a and 105b, the photoelectric conversion layer 110, the counter electrode 111, and the constituent layer 3e are shown.

As shown in FIG. 6A, the auxiliary electrode 104 is disposed between the first pixel electrode 102a and the first pixel electrode 102b of the respective pixels 10 adjacent to each other. When a voltage is applied to the counter electrode 111, a first-electrode charge trapping region 140a, a first-electrode charge trapping region 140b, and an auxiliary-electrode charge trapping region 142 occur in the photoelectric conversion layer 110. The first-electrode charge trapping region 140a is located above the first pixel electrode 102a and functions as a region where the signal charge generated in the photoelectric conversion layer 110 according to the intensity of the received light is collected by the first pixel electrode 102a. The first-electrode charge trapping region 140b is located above the first pixel electrode 102b and functions as a region where the signal charge is collected by the first pixel electrode 102b. The auxiliary-electrode charge trapping region 142 is located above the auxiliary electrode 104 and functions as a region where the signal charge is collected by the auxiliary electrode 104. Since the auxiliary-electrode charge trapping region 142 occurs between the first-electrode charge trapping region 140a and the first-electrode charge trapping region 140b, the regions for trapping signal charges are separated between the first pixel electrode 102a and the second pixel electrode 102b and thus it is possible to suppress color mixing between adjacent pixels. Furthermore, in pixel electrodes other than the first pixel electrode 102a and the first pixel electrode 102b which are located adjacent to each other via the auxiliary electrode 104, color mixing between adjacent pixels can be similarly suppressed.

FIG. 6B is a schematic cross-sectional view of pixels for a case where, unlike the structure shown in FIG. 6A in which the pixels 10 have the auxiliary electrode 104, no auxiliary electrode is provided for each pixel 10. In FIG. 6B, since the auxiliary electrode 104 is not provided, the auxiliary-electrode charge trapping region 142 does not occur. Therefore, an adjacent-electrode charge trapping region 143 occurs where overlapping occurs between the first-electrode charge trapping region 140a and the first-electrode charge trapping region 140b. The signal charge generated in the adjacent-electrode charge trapping region 143 can be collected in both the first-electrode charge trapping region 140a and the first-electrode charge trapping region 140b, and thus color mixing can occur between the adjacent pixels.

As described above, the imaging device 1 according to the present embodiment has the auxiliary electrode 104 which is commonly included in both the first imaging cell 100a and the second imaging cell 100b, and thus it is possible to efficiently collect the signal charge and it is possible to achieve a wide dynamic range while suppressing the color mixing between adjacent pixels. The pitch pitch_h is equal to the pitch pitch_l, and thus the image with the wide dynamic range output from the imaging device 1 has no resolution deterioration from the high-sensitivity image signal and the low-sensitivity image signal.

First Modification

Next, an imaging device according to a first modification of the first embodiment is described. This modification differs from the first embodiment in that the pixel does not include the second microlens 114. In the following description, a focus is put on differences from the first embodiment, and descriptions of similar elements or the like will be omitted or simplified.

Figure 7:
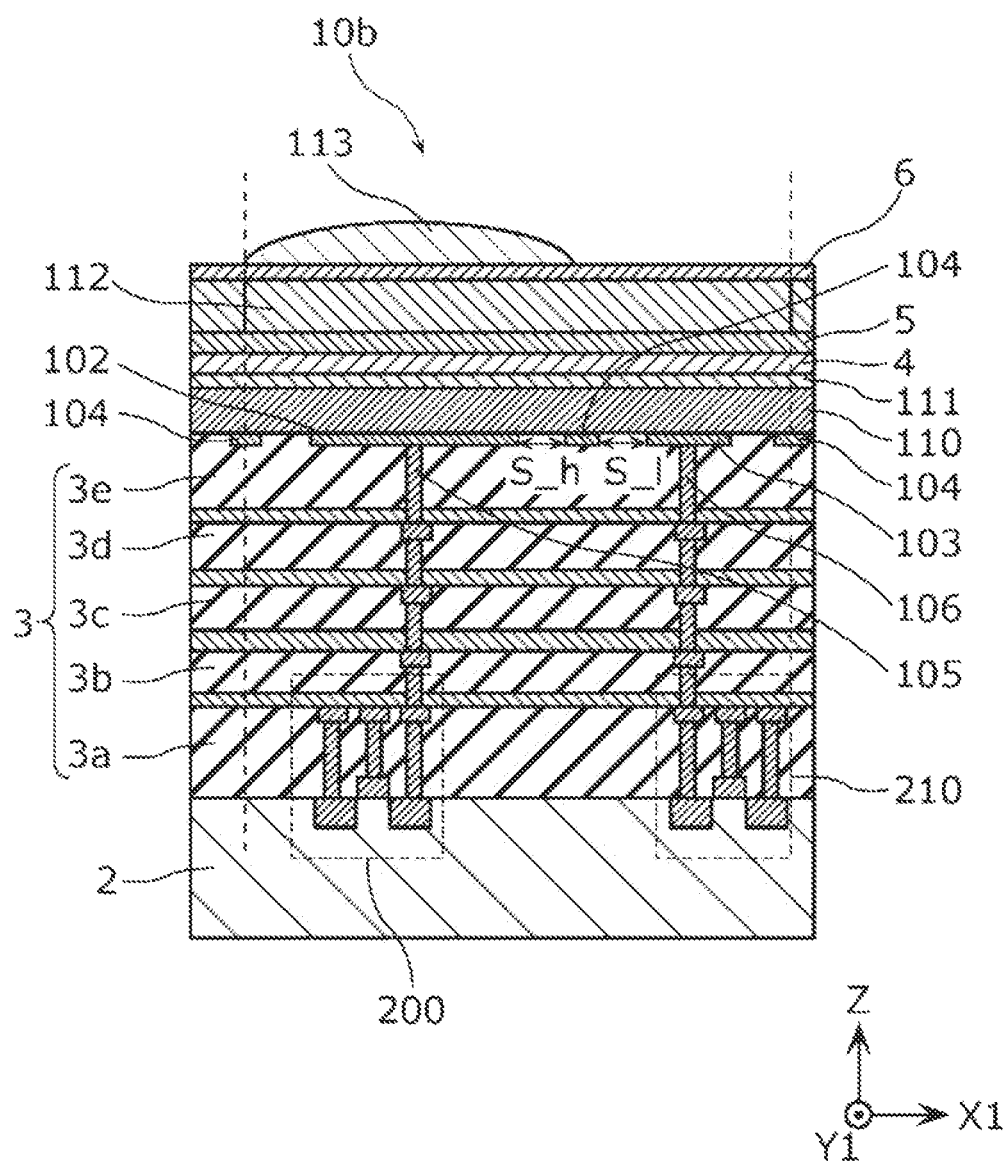
FIG. 7 is a schematic cross-sectional view of a pixel according to a modification of the first embodiment.

FIG. 7 is a schematic cross-sectional view of the pixel 10b according to this modification. As shown in FIG. 7, the pixel 10b has a configuration obtained by removing the second microlens 114 located above the second pixel electrode 103 in the configuration of the pixel 10 shown in FIG. 5. In this configuration, a reduction occurs in the light collection rate to the photoelectric conversion layer 110 in a region overlapping, in plan view, the second pixel electrode 103, and thus a reduction occurs in the sensitivity of the second imaging cell 100b including the second pixel electrode 103. This results in an increase in the ratio of the sensitivity of the first imaging cell 100a to the sensitivity of the second imaging cell 100b, and thus the imaging device according to this modification can expand the dynamic range.

Second Embodiment

Next, an imaging device according to a second embodiment is described below. This embodiment is different from the first embodiment in that the distance S_h and the distance S_l are different from each other, and more specifically, the distance S_h larger than the distance S_l. In the following description, a focus is put on differences from the first embodiment, and descriptions of similar elements or the like will be omitted or simplified.

Figure 8:
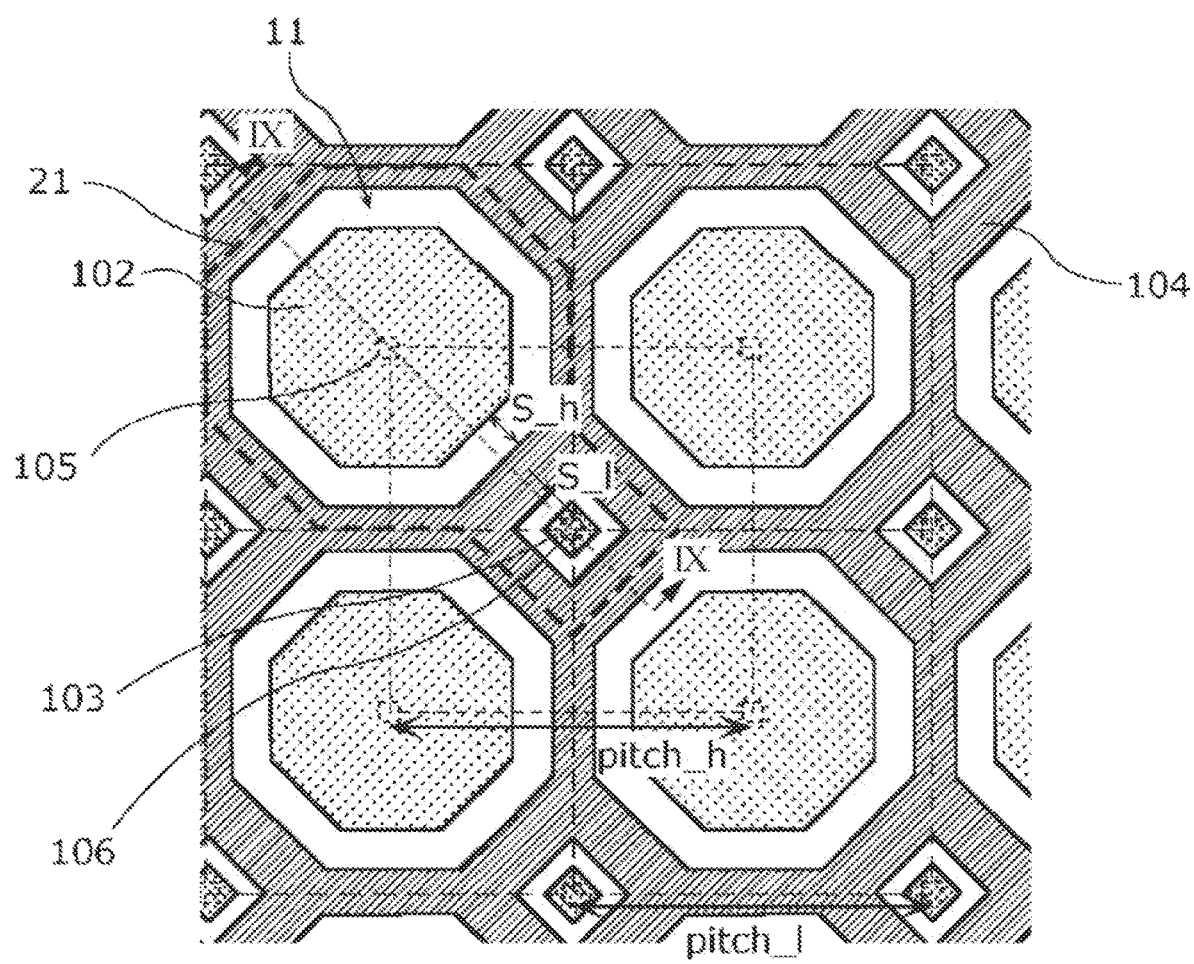
FIG. 8 is a plan view showing an example of a pixel electrode layout according to a second embodiment.

FIG. 8 is a plan view showing an example of a layout of electrodes of pixels 11 according to the present embodiment. As shown in FIG. 8, a pixel electrode region 21 corresponding to a pixel 11 is different from the pixel electrode region 20 shown in FIG. 4 in that the distance S_h from the first pixel electrode 102 to the auxiliary electrode 104 is different from the distance S_l from the second pixel electrode 103 to the auxiliary electrode 104, and more specifically, the distance S_h is larger than the distance S_l. That is, in each of a plurality of pixels 11, the distance S_h is larger than the distance S_l. As will be described in more detail later, by appropriately adjusting the relationship in terms of the distance S_h and the distance S_l, it is possible to achieve an expansion of the dynamic range.

Figure 9:
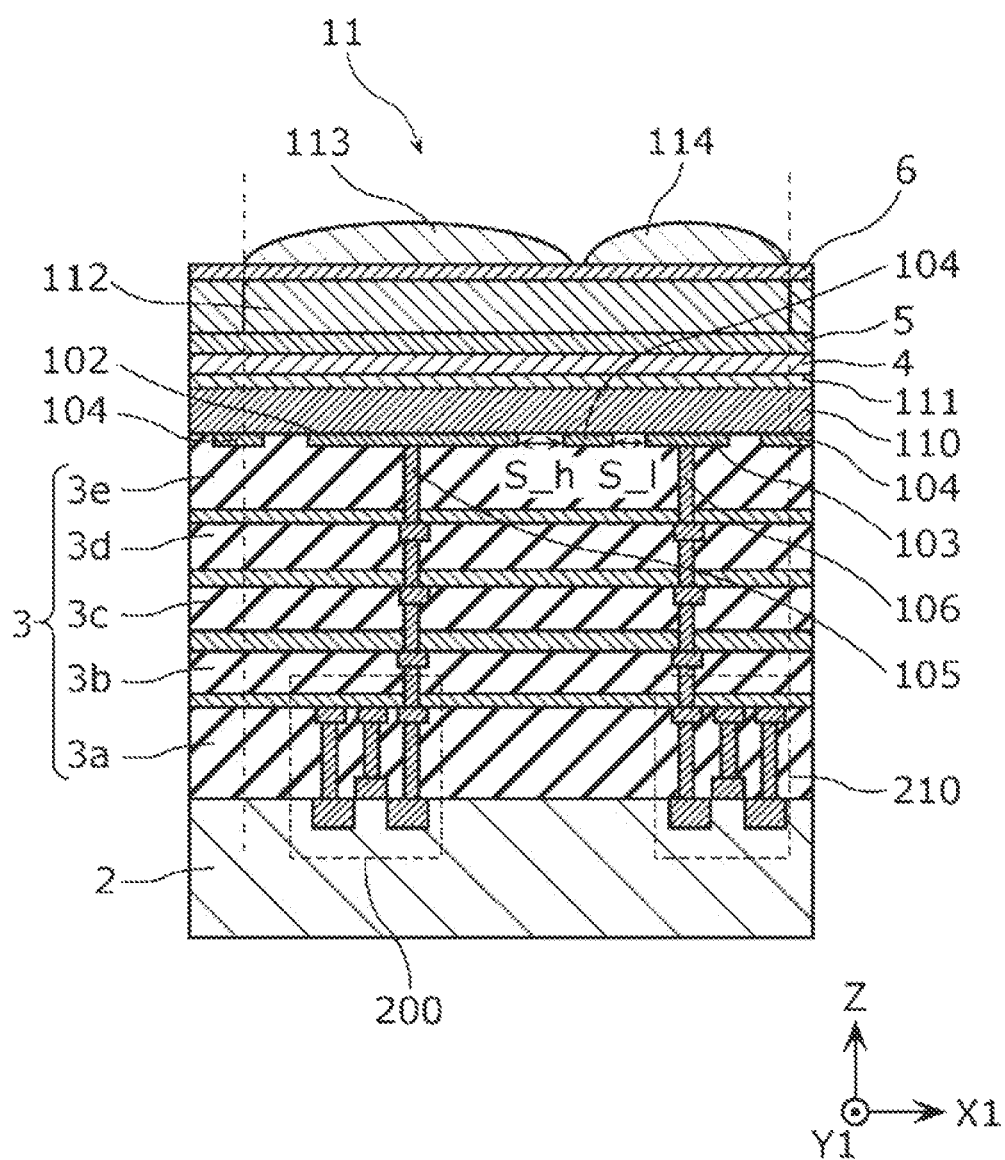
FIG. 9 is a schematic cross-sectional view of a pixel taken along line IX-IX of FIG. 8 according to the second embodiment.

FIG. 9 is a schematic cross-sectional view of the pixel 11 taken along line IX-IX of FIG. 8. In this configuration, the distance S_h in the pixel 11 is the same as that in the pixel 10 described above, and thus the coupling capacitance between the first pixel electrode 102 and the auxiliary electrode 104 is the same as that in the pixel 10. However, the distance S_l is smaller than in the pixel 10, and thus the coupling capacitance between the second pixel electrode 103 and the auxiliary electrode 104 is larger than in the pixel 10. As a result, in the pixel 11, the ratio of the sensitivity of the first imaging cell 100a including the first pixel electrode 102 to the sensitivity of the second imaging cell 100b including the second pixel electrode 103 becomes further larger than that in the configuration of the pixel 10. Therefore, the imaging device according to the present embodiment can realize a wider dynamic range while suppressing color mixing between adjacent pixels.

Figure 10:
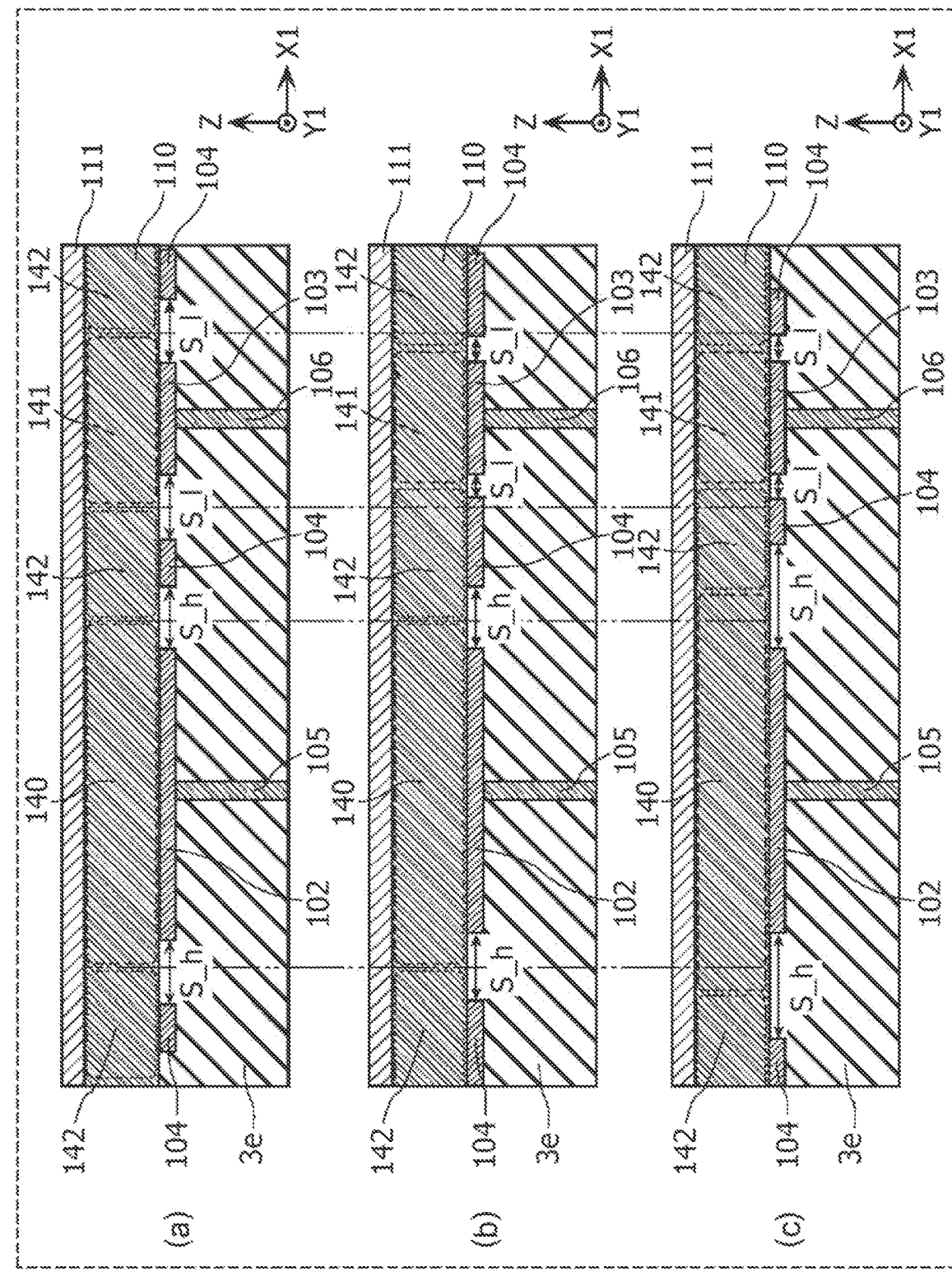
FIG. 10 is a schematic cross-sectional view for explaining a charge trapping region of a pixel electrode.

FIG. 10 is a schematic cross-sectional view for explaining a charge trapping region of a pixel electrode. Part (a) of FIG. 10 is an enlarged view of a part shown in FIG. 5, and more specifically, a part from the constituent layer 3e to the counter electrode 111 of the pixel 10 is shown in an enlarged fashion. Part (b) of FIG. 10 is an enlarged view of a portion of FIG. 9, and more specifically, a portion from the constituent layer 3e to the counter electrode 111 of the pixel 11 is shown in an enlarged fashion. Part (c) of FIG. 10 is a diagram showing a cross-sectional structure for a case where the difference between the distance S_h and the distance S_l is increased from the difference shown in part (b) of FIG. 10. Note that in parts (a), (b), and (c) of FIG. 10, only the first pixel electrode 102, the auxiliary electrode 104, the first electrode plug 105, the second electrode plug 106, the photoelectric conversion layer 110, the counter electrode 111, and the constituent layer 3e are shown, and illustration is simplified.

When a voltage is applied to the counter electrode 111, a first-electrode charge trapping region 140, a second-electrode charge trapping region 141, and an auxiliary-electrode charge trapping region 142 occur in the photoelectric conversion layer 110. The second-electrode charge trapping region 141 is located above the second pixel electrode 103 and functions as a region where the signal charge generated in the photoelectric conversion layer 110 according to the intensity of the received light is collected by the second pixel electrode 103. The first-electrode charge trapping region 140 and the auxiliary-electrode charge trapping region 142 are the same as described above with reference to FIG. 6A.

Since the distance S_l is shorter in the configuration shown in part (b) of FIG. 10 than in the configuration shown in part (a) of FIG. 10, the second-electrode charge trapping region 141 above the second pixel electrode 103 is smaller in the configuration shown in part (b) of FIG. 10 than in the configuration shown in part (a) of FIG. 10. As a result, the sensitivity of the second imaging cell 100b including the second pixel electrode 103 is lower in the configuration shown in part (b) of FIG. 10 than in the configuration shown in part (a) of FIG. 10, and thus it becomes possible to achieve a wider dynamic range. Furthermore, since the distance S_h is larger in the configuration shown in part (c) of FIG. 10 than in the configuration shown in part (b) of FIG. 10, the first-electrode charge trapping region 140 above the first pixel electrode 102 is larger in the configuration shown in part (c) of FIG. 10 than in the configuration shown in part (b) of FIG. 10. As a result, the sensitivity of the first imaging cell 100a including the first pixel electrode 102 is larger in the configuration shown in part (c) of FIG. 10 than in the configuration shown in part (b) of FIG. 10, and thus it becomes possible to achieve a wider dynamic range. That is, the larger the distance S_h compared with the distance S_l, the greater the dynamic range is obtained.

As described above, in the imaging device according to the present embodiment, the ratio of the capacitance of the first pixel electrode 102 to the capacitance of the second pixel electrode 103 is smaller than that in the case where the distance S_h and the distance S_l are equal to each other, and thus the electrical sensitivity of the first imaging cell 100a becomes high. Furthermore, the ratio of the size of the first-electrode charge trapping region 140 to the size of the second-electrode charge trapping region 141 is larger than in the case where the distance S_h and the distance S_l are equal to each other, and thus the optical sensitivity of the first imaging cell 100a becomes high. As a result, the imaging device according to the present embodiment can realize a wide dynamic range while suppressing color mixing between adjacent pixels.

First Modification

Next, an imaging device according to a modification of the second embodiment is described below. In this modification, the area of the first pixel electrode 102 is smaller than that in the configuration according to the second embodiment. In the following description, a focus is put on differences from the first embodiment, the second embodiment, and the modifications thereof, and descriptions of similar elements or the like will be omitted or simplified.

Figure 11:
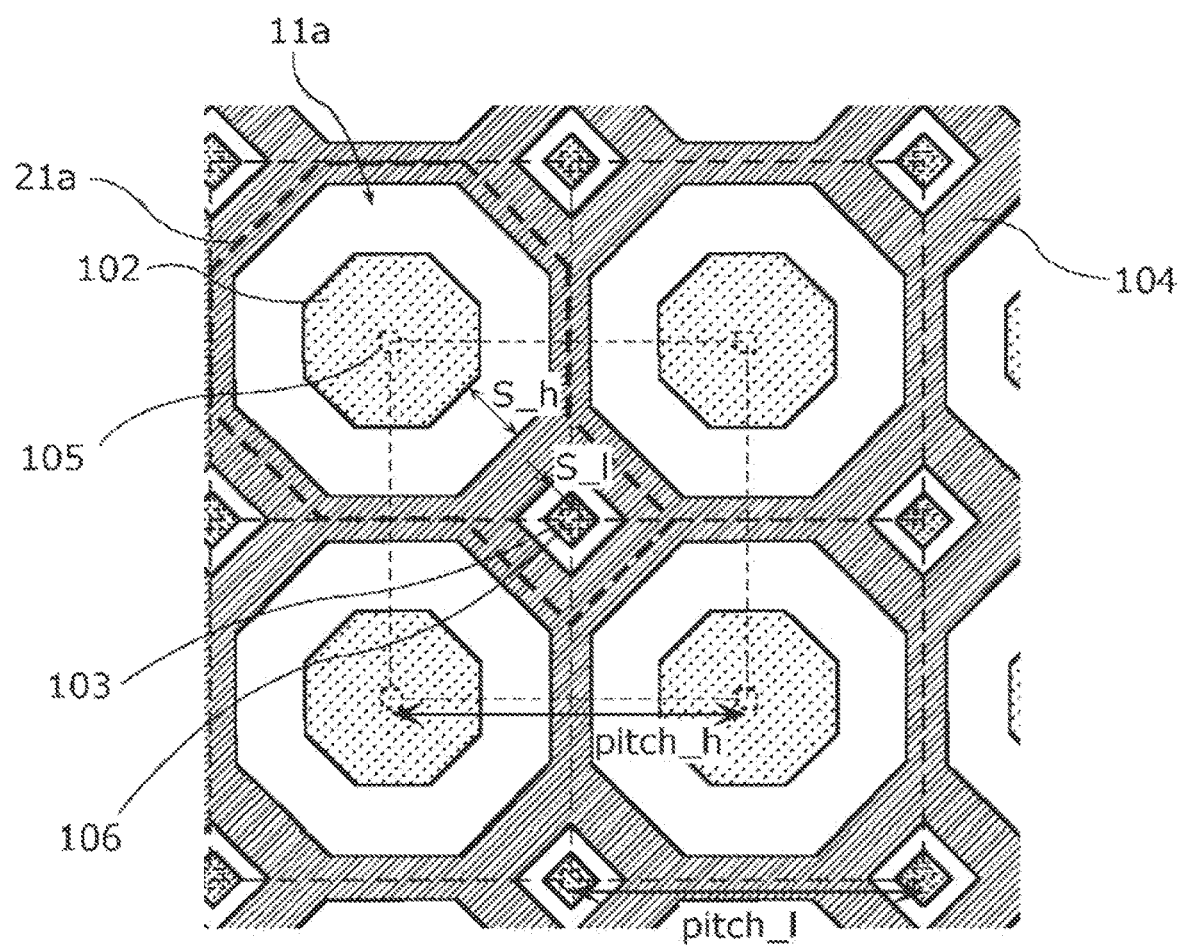
FIG. 11 is a plan view showing an example of a pixel electrode layout according to a first modification of the second embodiment.

FIG. 11 is a plan view showing an example of an electrode layout of the pixel 11a according to this modification. As shown in FIG. 11, in a pixel electrode region 21a corresponding to the pixel 11a, the area of the first pixel electrode 102 is smaller than in the pixel electrode region 21 shown in FIG. 8, and the distance S_h from the first pixel electrode 102 to the auxiliary electrode 104 is further increased. Therefore, in the pixel 11a, as compared with the pixel 11, a further reduction occurs in the coupling capacitance between the first pixel electrode 102 and the auxiliary electrode 104, and the electrical sensitivity of the first imaging cell 100a becomes high. Therefore, the imaging device according to the present modification can increase the ratio of the sensitivity of the first imaging cell 100a to the sensitivity of the second imaging cell 100b, and can realize a wide dynamic range. However, the reduction in the area of the first pixel electrode 102 causes a reduction in the region where the first pixel electrode 102 can collect the signal charge generated in the photoelectric conversion layer 110. To handle this situation, by increasing the light collection efficiency of the first microlens 113, it is possible to suppress a reduction in the optical sensitivity of the first imaging cell 100a.

Third Embodiment

Next, an imaging device according to a third embodiment is described below. The third embodiment differs from the second embodiment in that the imaging device includes an auxiliary electrode plug connected to the auxiliary electrode 104. In the following description, a focus is put on differences from the first embodiment, the second embodiment, and the modifications thereof, and descriptions of similar elements or the like will be omitted or simplified.

Figure 12:
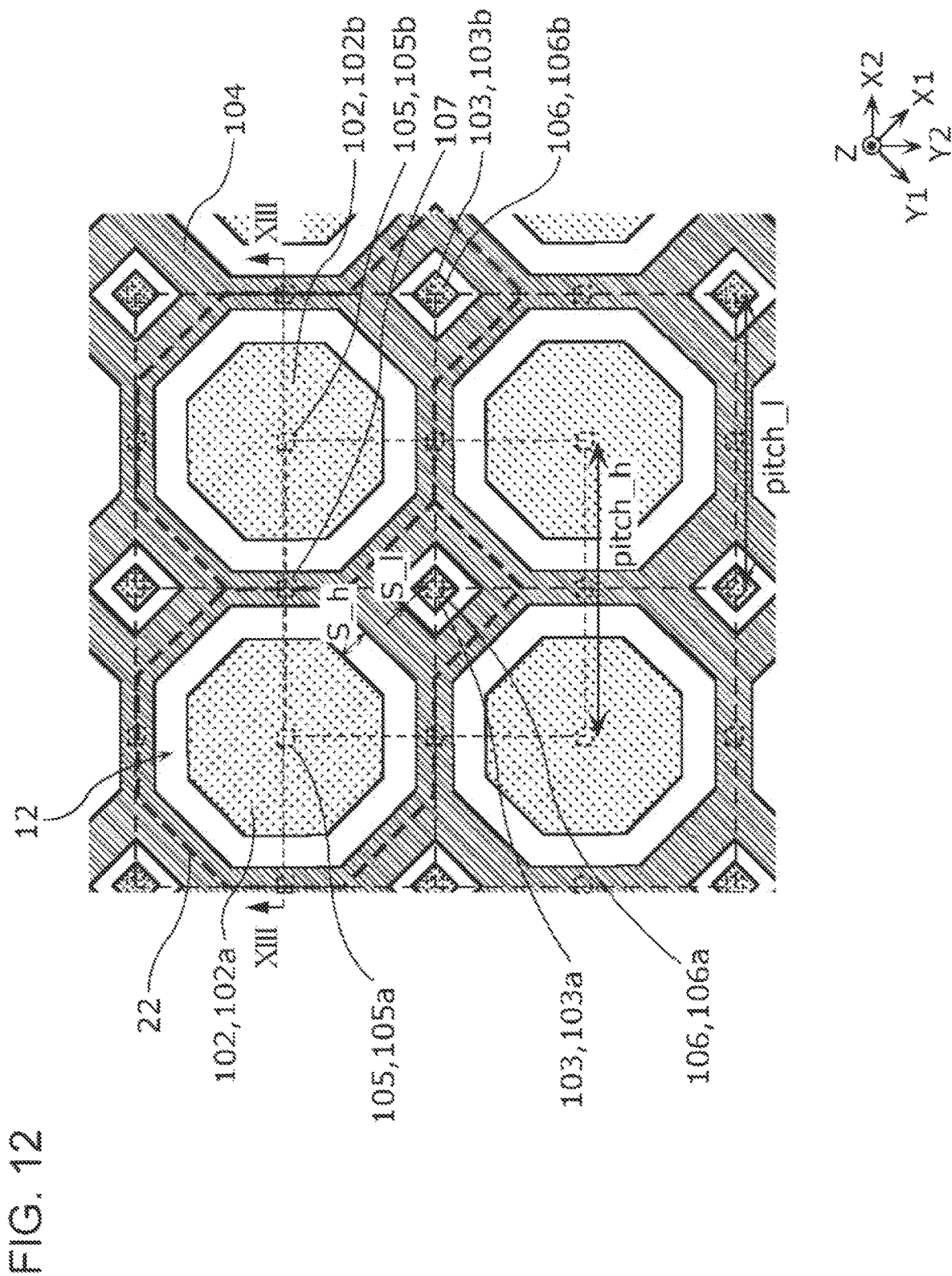
FIG. 12 is a plan view showing an example of a pixel electrode layout according to a third embodiment.

FIG. 12 is a plan view showing an example of a layout of electrodes of pixels 12 according to the present embodiment. As shown in FIG. 12, the pixel electrode region 22 is a region corresponding to the pixel 12. The pixel 12 has a configuration in which the auxiliary electrode plug 107 is further provided in addition to the elements provided in the pixel 11 shown in FIG. 8. In the present embodiment, the auxiliary electrode plug 107 connected to the auxiliary electrode 104 is disposed between the first pixel electrode 102a and the first pixel electrode 102b adjacent to each other. That is, the auxiliary electrode plug 107 is located, as seen in plan view, between the first pixel electrode 102a and the first pixel electrode 102b that are located adjacent to each other via the auxiliary electrode 104. For example, the auxiliary electrode plug 107 is commonly provided in the pixels 12 adjacent to each other. In the present embodiment, the first pixel electrode 102a is an example of the first electrode of the first set, and the first pixel electrode 102b is an example of the first electrode of the second set. The auxiliary electrode plug 107 is an example of the first auxiliary electrode plug.

For example, the auxiliary electrode plug 107 is located, as seen in plan view, on a line connecting the first electrode plug 105a connected to the first pixel electrode 102a and the first electrode plug 105b connected to the first pixel electrode 102b. Note that the auxiliary electrode plug 107 does not necessarily need to be located, as seen in plan view, on the line connecting the first electrode plug 105a and the first electrode plug 105b.

In the example shown in FIG. 12, one auxiliary electrode plug 107 is disposed between the first pixel electrode 102a and the first pixel electrode 102b, but a plurality of auxiliary electrode plugs 107 may be disposed between the first pixel electrode 102a and the first pixel electrode 102b.

Figure 13:
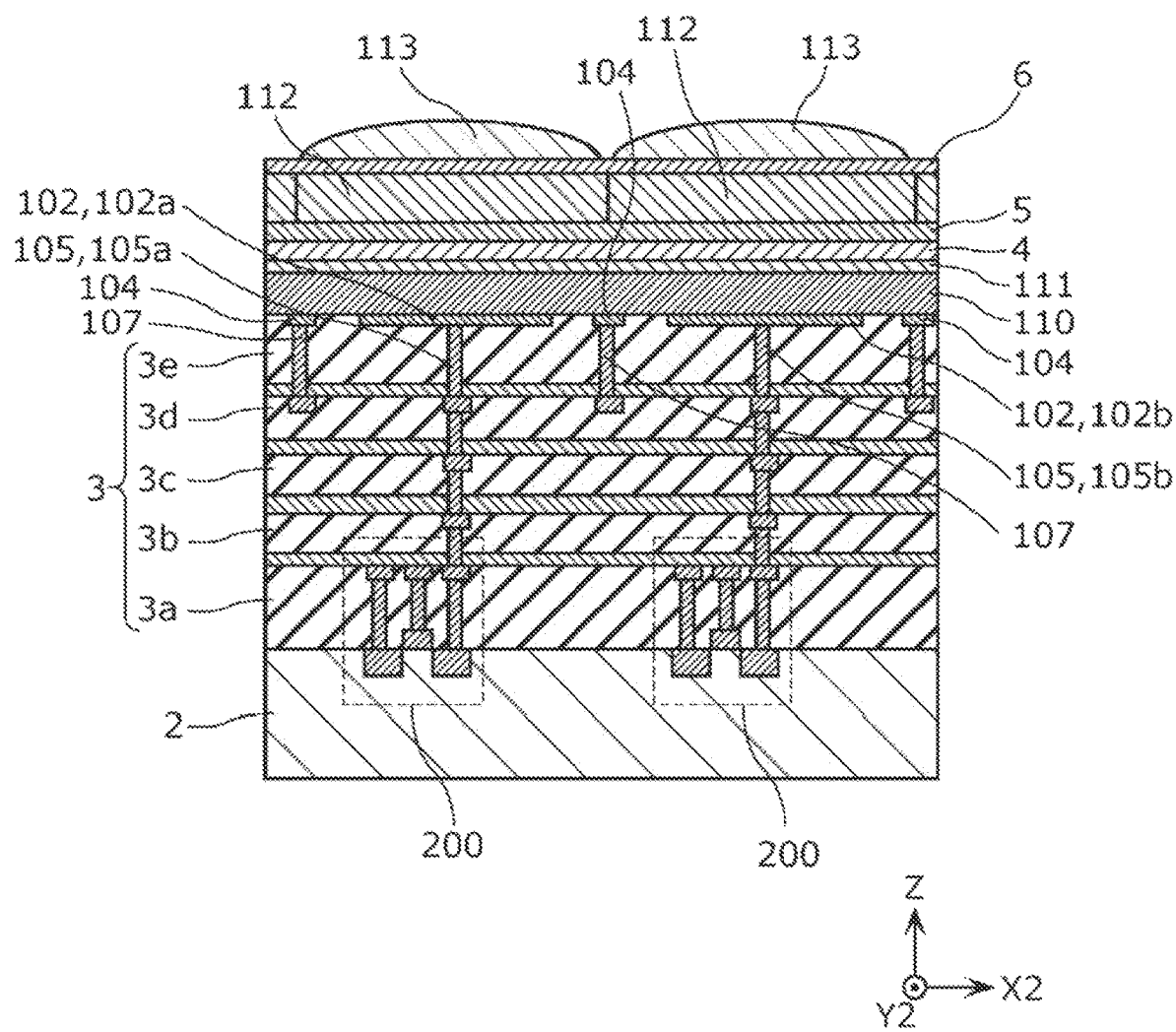
FIG. 13 is a schematic cross-sectional view of a pixel taken along line XIII-XIII of FIG. 12 according to the third embodiment.

FIG. 13 is a schematic cross-sectional view of the pixel 12 taken along line XIII-XIII of FIG. 12. As shown in FIG. 13, the auxiliary electrode plug 107 is connected to the side opposite to the photoelectric conversion layer 110 of the auxiliary electrode 104. Furthermore, the auxiliary electrode plug 107 is disposed such that the distance between the auxiliary electrode plug 107 and the first electrode plug 105a and the distance between the auxiliary electrode plug 107 and the first electrode plug 105b are smaller than the distance between the first electrode plug 105a and the first electrode plug 105b. By disposing the auxiliary electrode plug 107 between the first electrode plug 105a and the first electrode plug 105b in the above-described manner, it is possible to achieve a great reduction in the coupling capacitance between the first electrode plug 105a and the first electrode plug 105b, and thus it is possible to reduce the electrical color mixing between adjacent pixels.

First Modification

Next, an imaging device according to a first modification of the third embodiment is described below. In this modification, the location of the auxiliary electrode plug is different from that in the third embodiment. In the following description, a focus is put on differences from the first embodiment, the second embodiment, the third embodiment, and the modifications thereof, and descriptions of similar elements or the like will be omitted or simplified.

Figure 14:
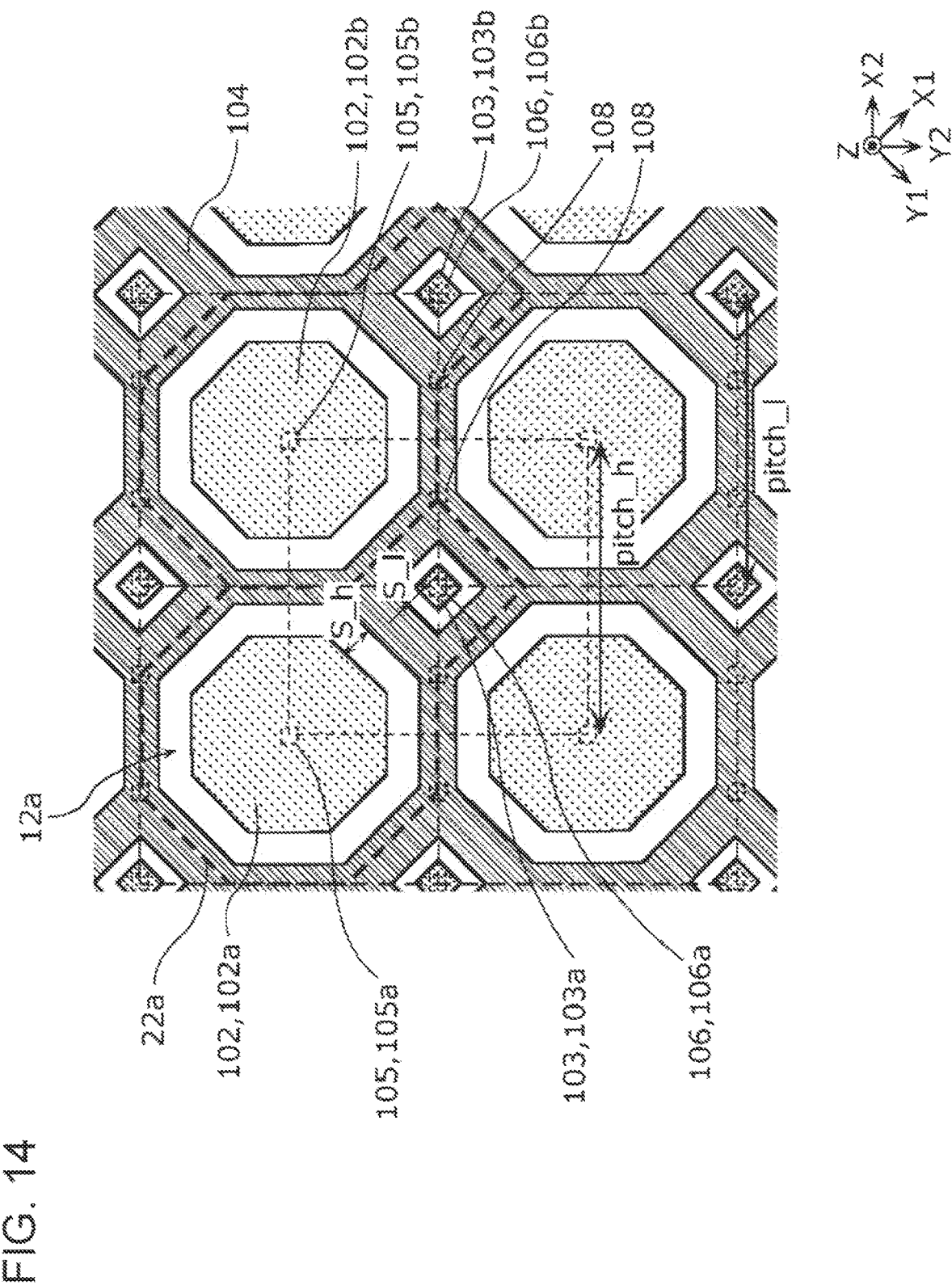
FIG. 14 is a plan view showing an example of a pixel electrode layout according to a first modification of the third embodiment.

FIG. 14 is a plan view showing an example of an electrode layout of the pixel 12a according to the first modification. As shown in FIG. 14, the pixel electrode region 22a is a region corresponding to the pixel 12a. The pixel 12a has a configuration in which the auxiliary electrode plug 108 is provided instead of the auxiliary electrode plug 107 in the pixel 12 shown in FIG. 12. In the present modification, the auxiliary electrode plug 108 connected to the auxiliary electrode 104 is disposed between the second pixel electrode 103a and the second pixel electrode 103b adjacent to each other. That is, the auxiliary electrode plug 108 is located, as seen in plan view, between the second pixel electrode 103a and the second pixel electrode 103b that are located adjacent to each other via the auxiliary electrode 104. In the present modification, the second pixel electrode 103a is an example of the second electrode of the third set, and the second pixel electrode 103b is an example of the second electrode of the fourth set. The auxiliary electrode plug 108 is an example of the second auxiliary electrode plug. The auxiliary electrode plug 108 is connected to the auxiliary electrode 104 on the side opposite to the photoelectric conversion layer 110 (not shown in FIG. 14).

For example, the auxiliary electrode plug 108 is located, as seen in plan view, on a line connecting the second electrode plug 106a connected to the second pixel electrode 103a and the second electrode plug 106b connected to the second pixel electrode 103b. Note that the auxiliary electrode plug 108 does not necessarily need to be located, as seen in plan view, on the line connecting the second electrode plug 106a and the second electrode plug 106b. In the example shown in FIG. 14, the auxiliary electrode plug 108 is not located on the line connecting the first electrode plug 105a and the first electrode plug 105b.

In the example shown in FIG. 14, two auxiliary electrode plugs 108 are disposed between the second pixel electrode 103a and the second pixel electrode 103b, but one or three or more auxiliary electrode plugs 108 may be disposed between the second pixel electrode 103a and the second pixel electrode 103b.

The disposing of the auxiliary electrode plug 108 between the second pixel electrode 103a and the second pixel electrode 103b results in an occurrence of coupling capacitance between the second electrode plug 106a and the auxiliary electrode plug 108 and between the second electrode plug 106b and the auxiliary electrode plug 108. This results in a reduction in the electrical sensitivity of the second imaging cell 100b including the second pixel electrode 103. As a result, the ratio of the sensitivity of the first imaging cell 100a to the sensitivity of the second imaging cell 100b becomes large, and thus it is possible to expand the dynamic range while suppressing the color mixing between adjacent pixels by the auxiliary electrode 104.

By disposing the auxiliary electrode plug 108 between the second electrode plug 106a and the second electrode plug 106b, it is possible to achieve a great reduction in the coupling capacitance between the second electrode plug 106a and the second electrode plug 106b, and thus it is possible to reduce the electrical color mixing between adjacent pixels.

Second Modification

Next, an imaging device according to a second modification of the third embodiment is described below. This modification is different in the location of the auxiliary electrode plug from the third embodiment and the first modification of the third embodiment. In the following description, a focus is put on differences from the first embodiment, the second embodiment, the third embodiment, and the modifications thereof, and descriptions of similar elements or the like will be omitted or simplified.

FIG. 15 is a plan view showing an example of an electrode layout of the pixel 12b according to the this modification. As shown in FIG. 15, the pixel electrode region 22b is a region corresponding to the pixel 12b. The pixel 12b has a configuration in which the auxiliary electrode plug 109 is provided instead of the auxiliary electrode plug 107 in the pixel 12 shown in FIG. 12. In the present modification, the auxiliary electrode plug 109 connected to the auxiliary electrode 104 is disposed between the first pixel electrode 102 and the second pixel electrode 103 adjacent to each other. In this modification, the auxiliary electrode plug 109 is an example of the third auxiliary electrode plug.

The auxiliary electrode plug 109 is disposed such that, as seen in plan view, the distance between the auxiliary electrode plug 109 and the second pixel electrode 103, which is closest, of all second pixel electrodes 103 included in the respective pixels 12b, to the auxiliary electrode plug 109, is smaller than the distance between the auxiliary electrode plug 109 and the first pixel electrode 102, which is closest, of all first pixel electrodes 102 included in the respective pixels 12b, to the auxiliary electrode plug 109. For example, the auxiliary electrode plug 109 is located, as seen in plan view, between the first pixel electrode 102 and the second pixel electrode 103 included in the same pixel 12b. In the present modification, the auxiliary electrode plug 109 is an example of the third auxiliary electrode plug. Note that it is sufficient if the auxiliary electrode plug 109 is located between the first pixel electrode 102 and the second pixel electrode 103 located adjacent to each other, and the auxiliary electrode plug 109 does not necessarily need to be located between the first pixel electrode 102 and the second pixel electrode 103 included in the same pixel 12b.

For example, the auxiliary electrode plug 109 is located, as seen in plan view, on a line connecting the first electrode plug 105 and the second electrode plug 106 that are located adjacent to each other. Note that the auxiliary electrode plug 109 does not necessarily need to be located, as seen in plan view, on the line connecting the first electrode plug 105 and the second electrode plug 106 that are located adjacent to each other. For example, the auxiliary electrode plug 109 is located between the first electrode plug 105 and the second electrode plug 106 included in the same pixel 12b. For example, the auxiliary electrode plug 109 is located on a line connecting the first electrode plug 105 included in one of the pixels 12b adjacent to each other and the second electrode plug 106 included in the other one of the pixels 12b.

In the example shown in FIG. 15, one auxiliary electrode plug 109 is disposed between the first pixel electrode 102 and the second pixel electrode 103, but a plurality of auxiliary electrode plugs 109 may be disposed between the first pixel electrode 102 and the second pixel electrode 103 located adjacent to each other. A plurality of auxiliary electrode plugs 109 are disposed around one second pixel electrode 103. Only one auxiliary electrode plug 109 may be disposed in an area around one second pixel electrode 103.

Figure 16:
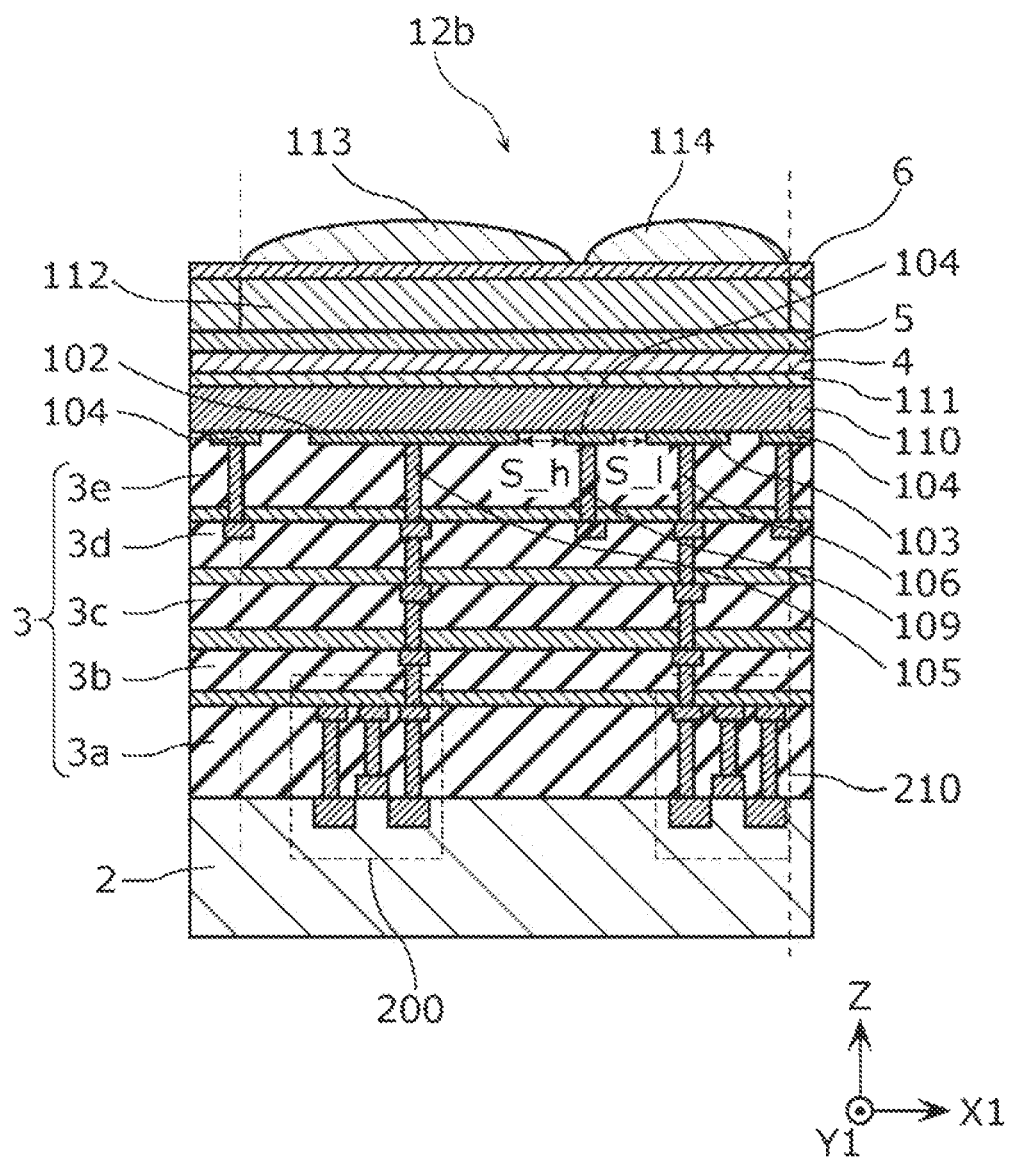
FIG. 16 is a schematic cross-sectional view of a pixel taken along line XVI-XVI of FIG. 15 according to a second modification of the third embodiment.

FIG. 16 is a schematic cross-sectional view of the pixel 12b taken along line XVI-XVI of FIG. 15. As shown in FIG. 16, the auxiliary electrode plug 109 is connected to the auxiliary electrode 104 on the side opposite to the photoelectric conversion layer 110. The auxiliary electrode plug 109 is disposed such that the distance from the auxiliary electrode plug 109 to the first electrode plug 105 closest, of all first electrode plugs, to the auxiliary electrode plug 109 is larger than the distance from the auxiliary electrode plug 109 to the second electrode plug 106 closest, of all second electrode plugs 106, to the auxiliary electrode plug 109. Therefore, the coupling capacitance between the first electrode plug 105 and the auxiliary electrode plug 109 is smaller than the coupling capacitance between the second electrode plug 106 and the auxiliary electrode plug 109. As a result, compared to the case where the auxiliary electrode plug 109 is not provided, the ratio of the electric sensitivity of the first imaging cell 100a including the first pixel electrode 102 to the electric sensitivity of the second imaging cell 100b including the second pixel electrode 103 becomes large, and thus it is possible to achieve a further increase in the dynamic range.

Fourth Embodiment

Next, an imaging device according to a fourth embodiment is described below. In the first to third embodiments, the area of the first pixel electrode 102 is set to be larger than the area of the second pixel electrode 103 to obtain the ratio, equal to or larger than 1, of the sensitivity of the first imaging cell 100a or 100a1 to the sensitivity of the second imaging cell 100b. In the present embodiment, in order to further increase the ratio of the sensitivity of the first imaging cell to the sensitivity of the second imaging cell, a capacitive element is connected to the charge storage node of the second imaging cell. In the following description, a focus will be put on differences from the first embodiment, the second embodiment, the third embodiment, and the modifications thereof, and descriptions of similar elements or the like will be omitted or simplified.

Figure 17:
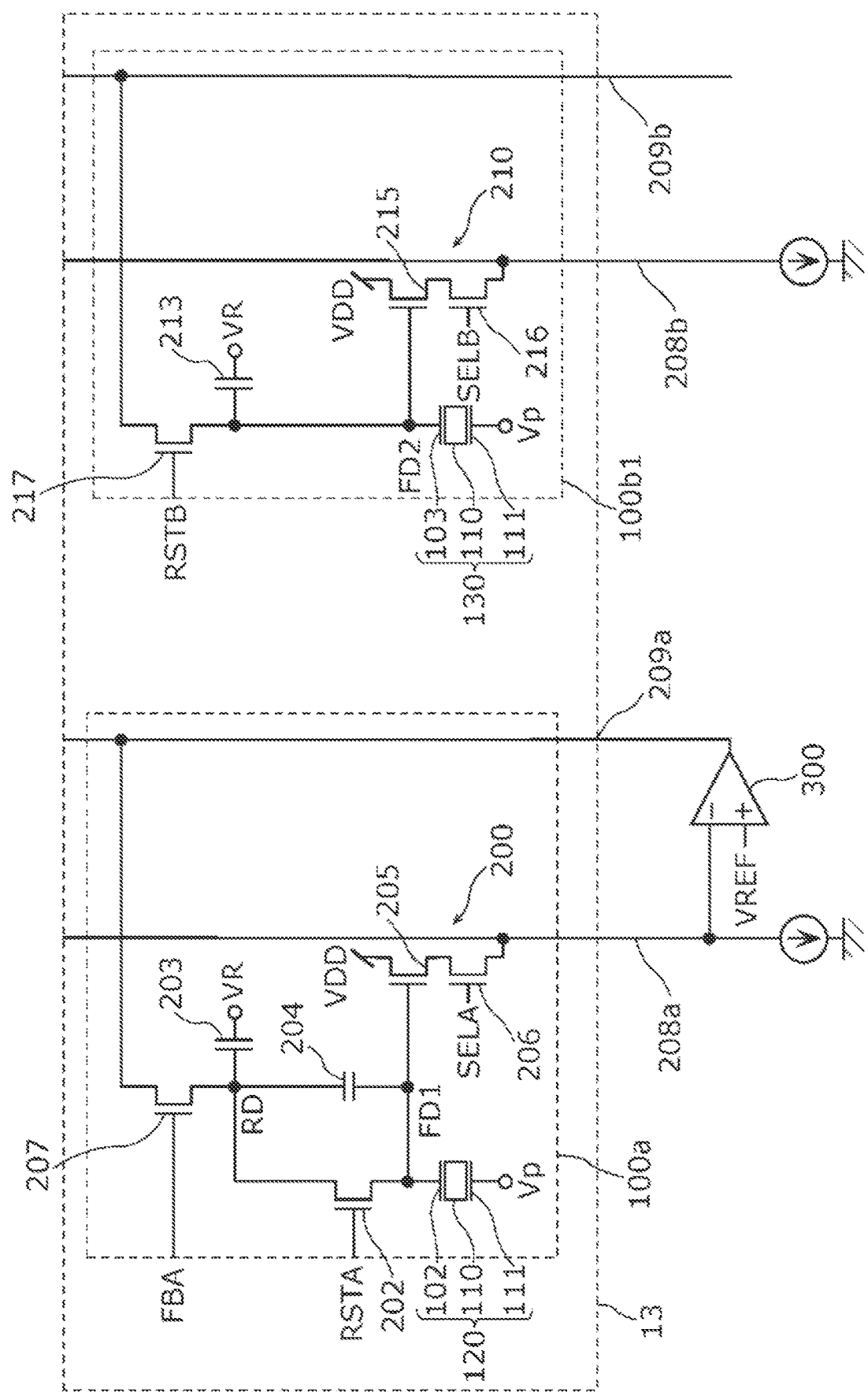
FIG. 17 is a diagram showing an example of a pixel circuit configuration according to a fourth embodiment.

FIG. 17 is a diagram showing an example of a circuit configuration of the pixel 13 according to the present embodiment. As shown in FIG. 17, the pixel 13 includes a first imaging cell 100a and a second imaging cell 100b1. The second imaging cell 100b1 has a configuration further including a third capacitive element 213 connected to the charge storage node FD2 in addition to the elements of the second imaging cell 100b shown in FIG. 2. In the present embodiment, the second charge storage region includes the third capacitive element 213 connected between the charge storage node FD2 and the reference voltage VR. In the present embodiment, the capacitance of the second charge storage region including the charge storage node FD2 is larger than the capacitance of the first charge storage region including the charge storage node FD1.

The second imaging cell 100b1 has not only parasitic capacitance but also added third capacitive element 213, and thus a reduction occurs in the sensitivity of the second imaging cell 100b1, which makes it possible for the imaging device according to the present embodiment to achieve a still wider dynamic range.

Figure 18:
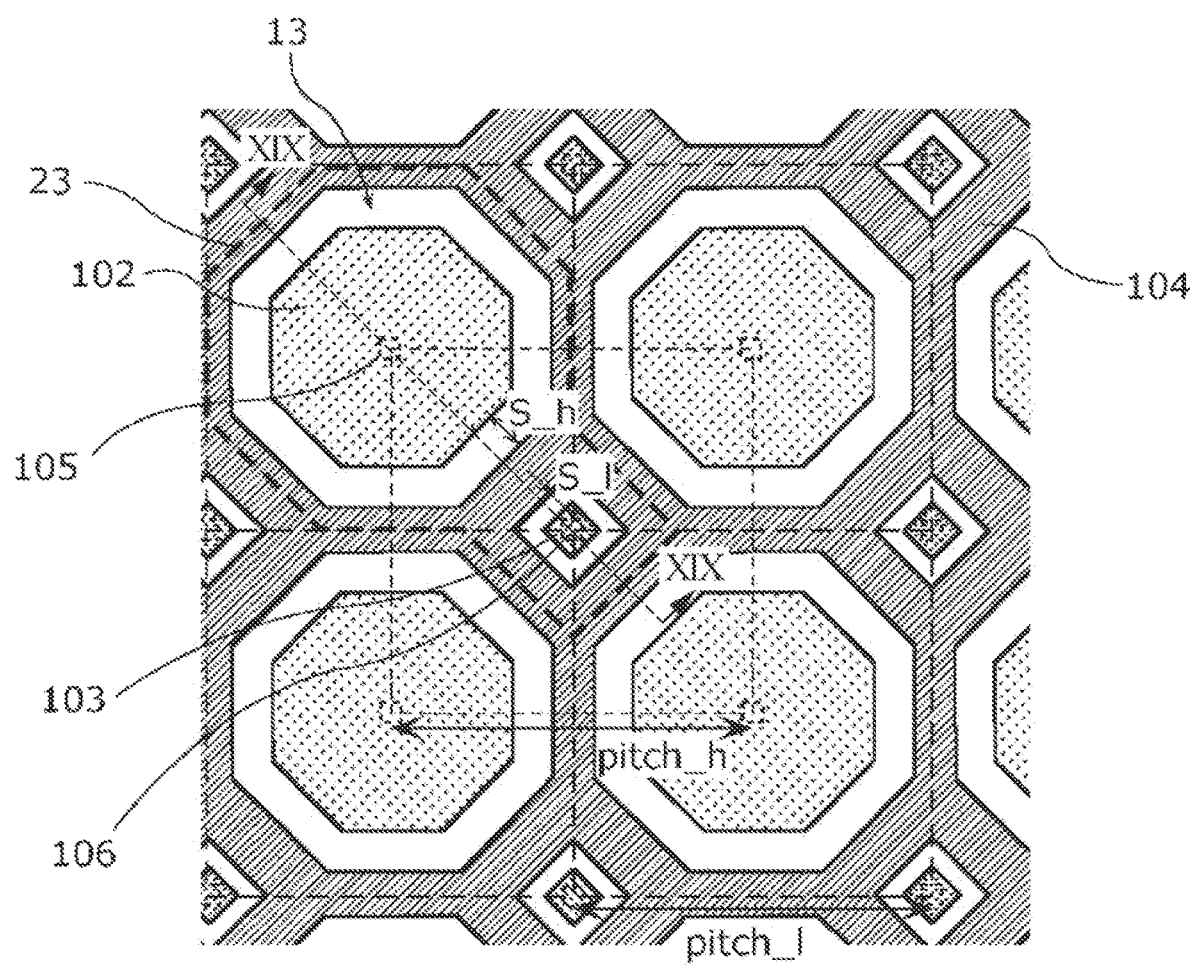
FIG. 18 is a plan view showing an example of a pixel electrode layout according to the fourth embodiment.

FIG. 18 is a plan view showing an example of a layout of electrodes of pixels 13 according to the present embodiment. The pixel electrode region 23 is a region corresponding to the pixel 13. In the electrode layout of the pixel 13 shown in FIG. 18, as with the electrode lay out of the pixel 11 shown in FIG. 8, the area of the first pixel electrode 102 is larger than the area of the second pixel electrode 103, and the distance S_h from the first pixel electrode 102 to the auxiliary electrode 104 is larger than the distance S_l from the second pixel electrode 103 to the auxiliary electrode 104. The electrode layout of the pixel 13 shown in FIG. 18 is the same as the electrode layout of the pixel 11 according to the second embodiment described above with reference to FIG. 8, and thus a further detailed description thereof is omitted.

Figure 19:
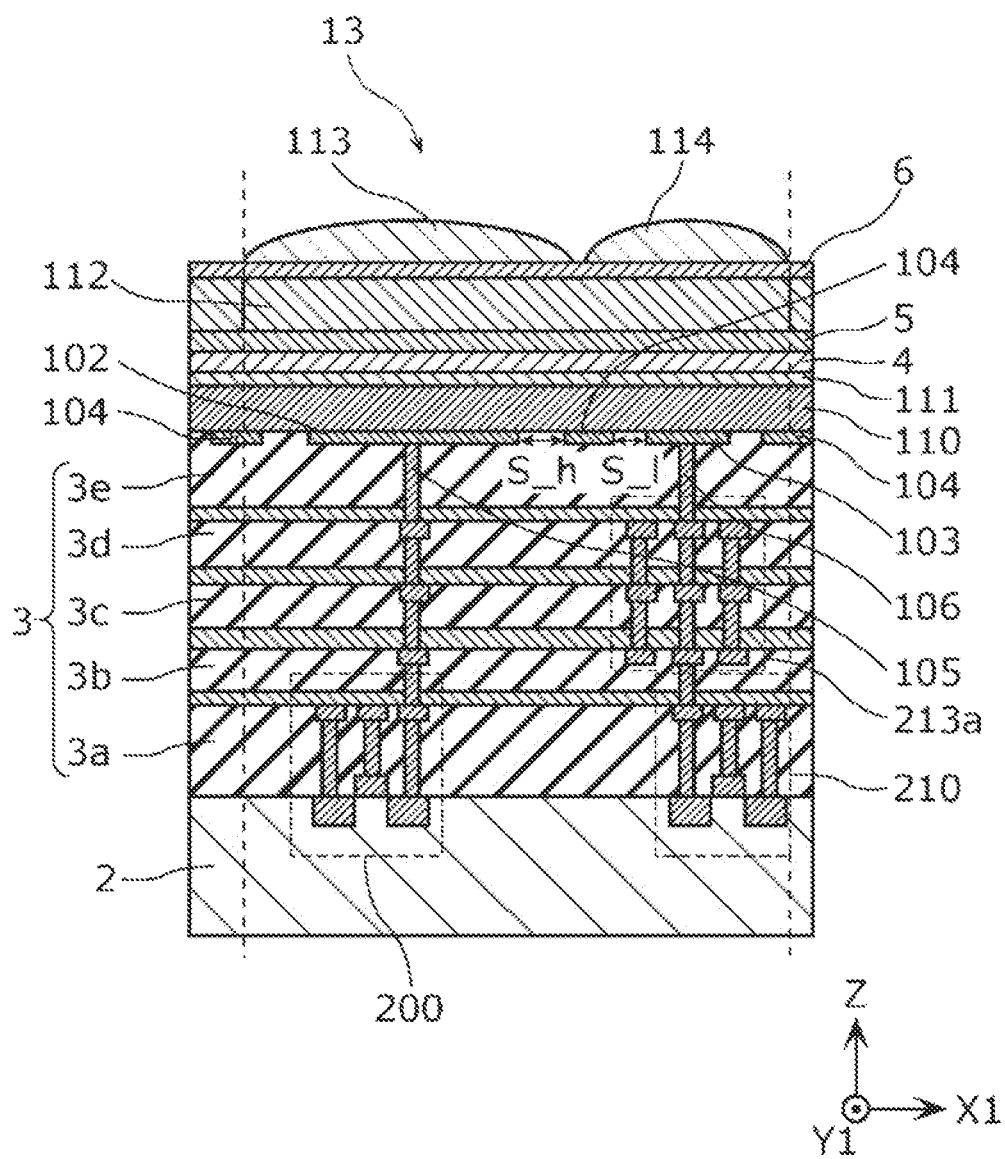
FIG. 19 is a schematic cross-sectional view of a pixel taken along line XIX-XIX of FIG. 18 according to the fourth embodiment.

FIG. 19 is a schematic cross-sectional view of the pixel 13 taken along line XIX-XIX of FIG. 18. As shown in FIG. 19, in the pixel 13, as the third capacitive element 213 in the circuit configuration shown in FIG. 17, a MOM capacitor 213a using a wiring layer or the like is connected to the charge storage node FD2 connected to the second pixel electrode 103. This causes a reduction in the sensitivity of the second imaging cell 100b1.

Figure 20:
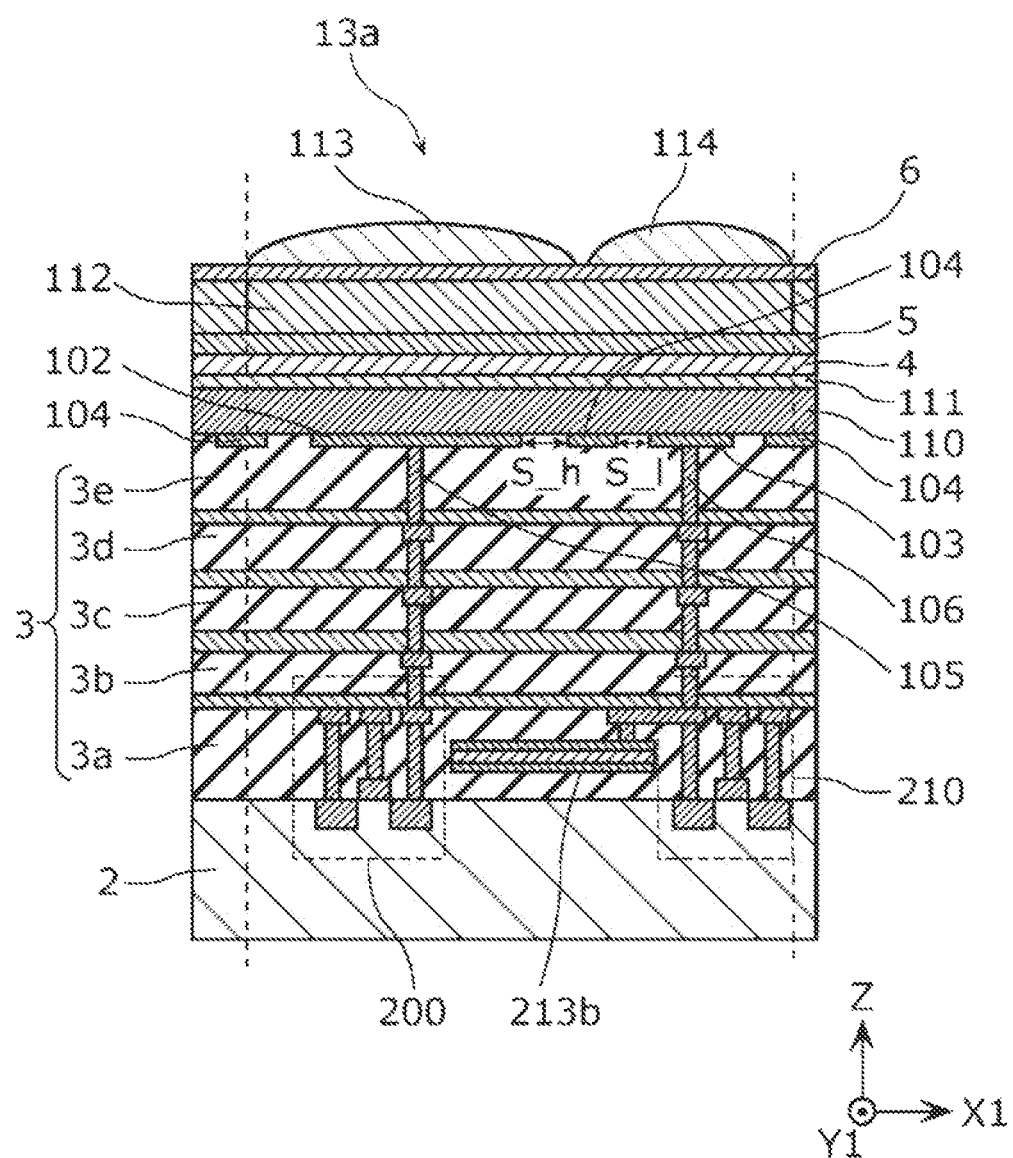
FIG. 20 is a schematic cross-sectional view of another example of a pixel according to the fourth embodiment.

FIG. 20 is a schematic cross-sectional view of a pixel 13a, which is another example of a pixel according to the present embodiment. As shown in FIG. 20, in the pixel 13a, instead of the MOM capacitor 213a in the pixel 13 shown in FIG. 19, a MIM capacitor 213b is connected to the charge storage node FD2 connected to the second pixel electrode 103. This causes a reduction in the sensitivity of the second imaging cell 100b1.

Figure 21:
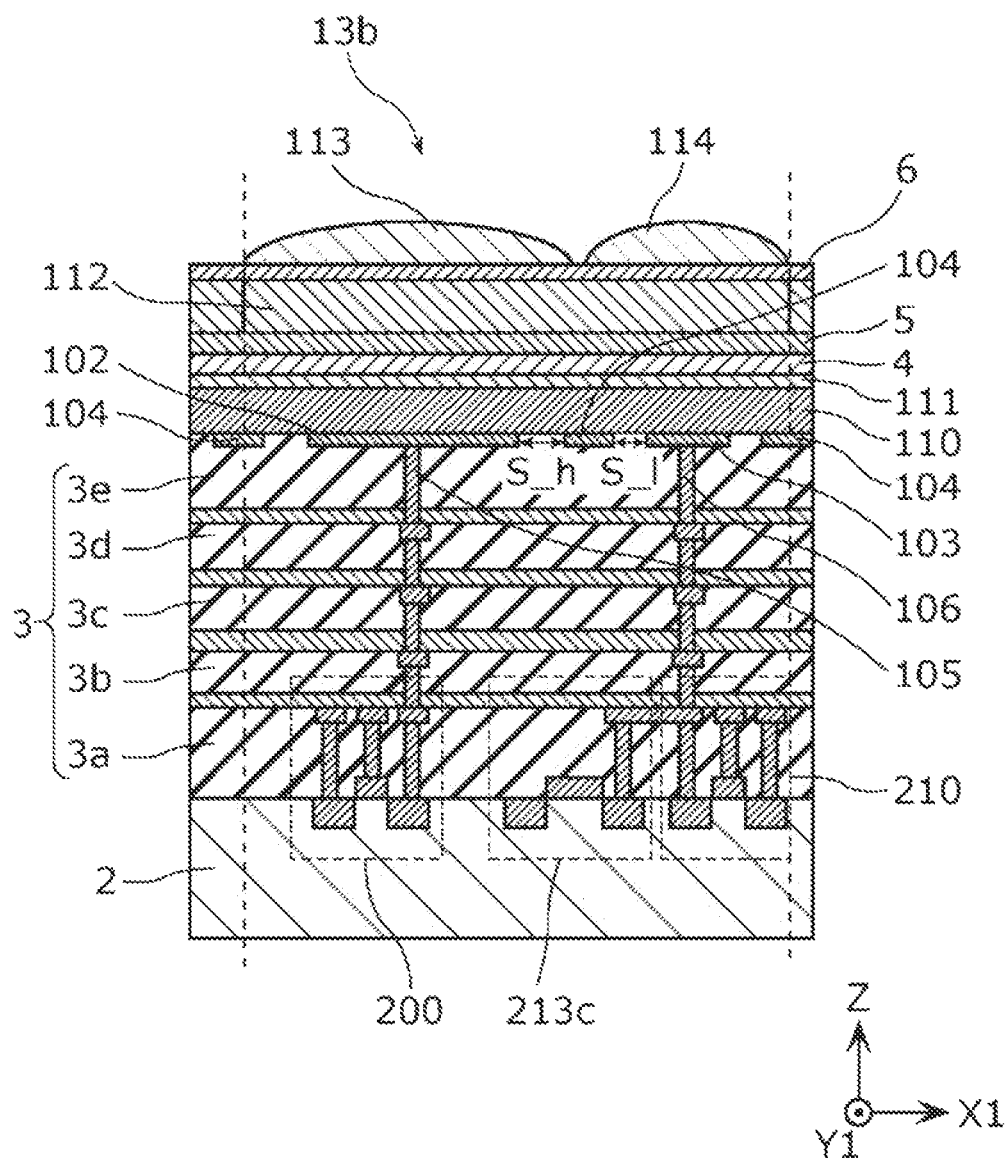
FIG. 21 is a schematic cross-sectional view of still another example of a pixel according to the fourth embodiment.

FIG. 21 is a schematic cross-sectional view of a pixel 13b, which is still another example of a pixel according to the present embodiment. As shown in FIG. 21, in the pixel 13b, instead of the MOM capacitor 213a in the pixel 13 shown in FIG. 19, a MOS capacitor 213c is connected to the charge storage node FD2 connected to the second pixel electrode 103. This causes a reduction in the sensitivity of the second imaging cell 100b1.

Figure 22:
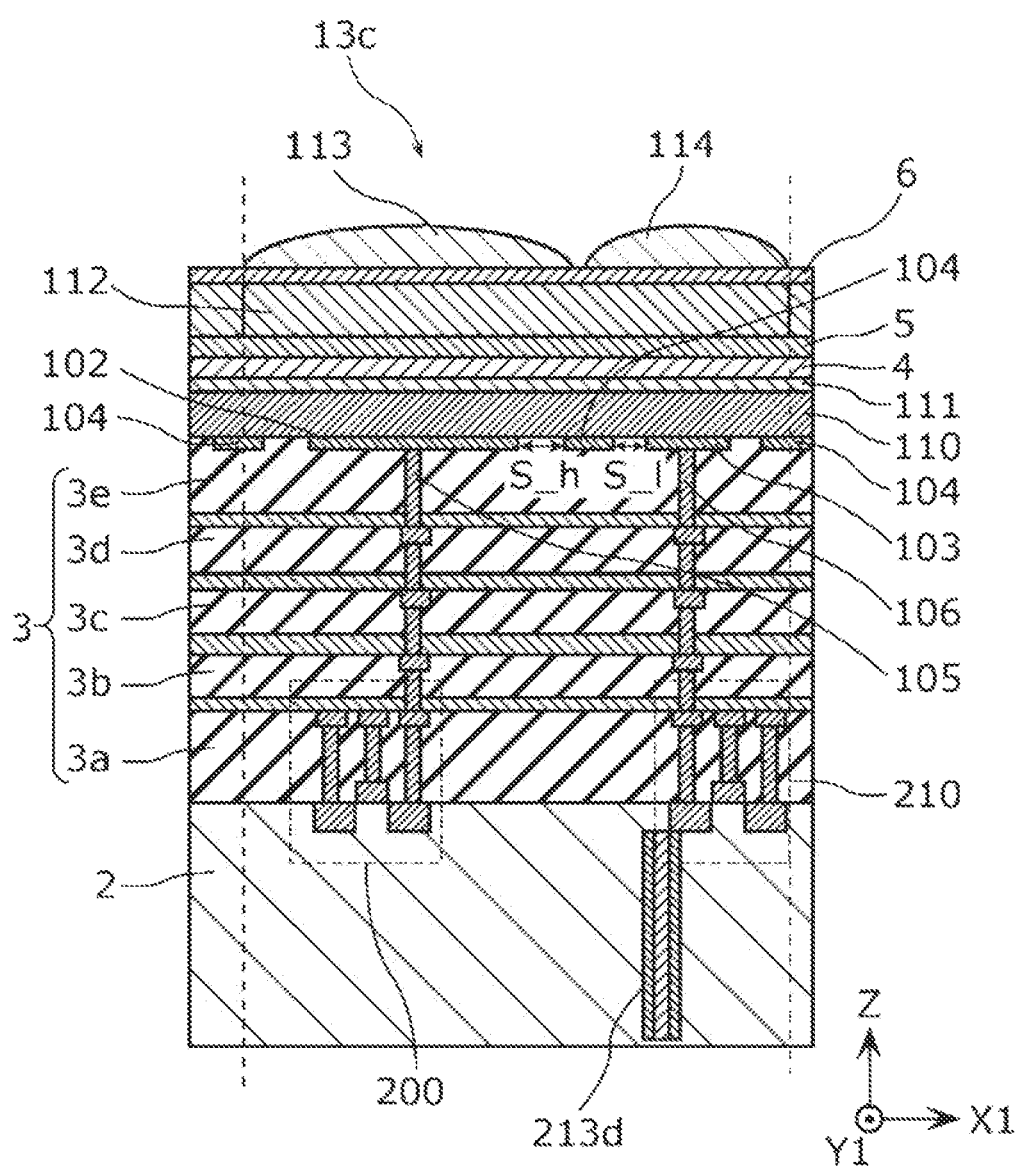
FIG. 22 is a schematic cross-sectional view of still another example of a pixel according to the fourth embodiment.

FIG. 22 is a schematic cross-sectional view of a pixel 13c, which is still another example of a pixel according to the present embodiment. As shown in FIG. 22, in the pixel 13c, instead of the MOM capacitor 213a in the pixel 13 shown in FIG. 19, a trench capacitor 213d such as that used in a DRAM (Dynamic Random Access Memory) is connected to the charge storage node FD2 connected to the second pixel electrode 103. This causes a reduction in the sensitivity of the second imaging cell 100b1.

Another type of capacitive element other than the capacitive elements shown in FIGS. 19 to 22 may be used as the third capacitive element. The third capacitive element may be a combination of some of the capacitive elements shown in FIGS. 19 to 22.

In the present embodiment, the pixel configuration may be a combination of pixel configurations according to the first to third embodiments and modifications thereof.

Figure 23:
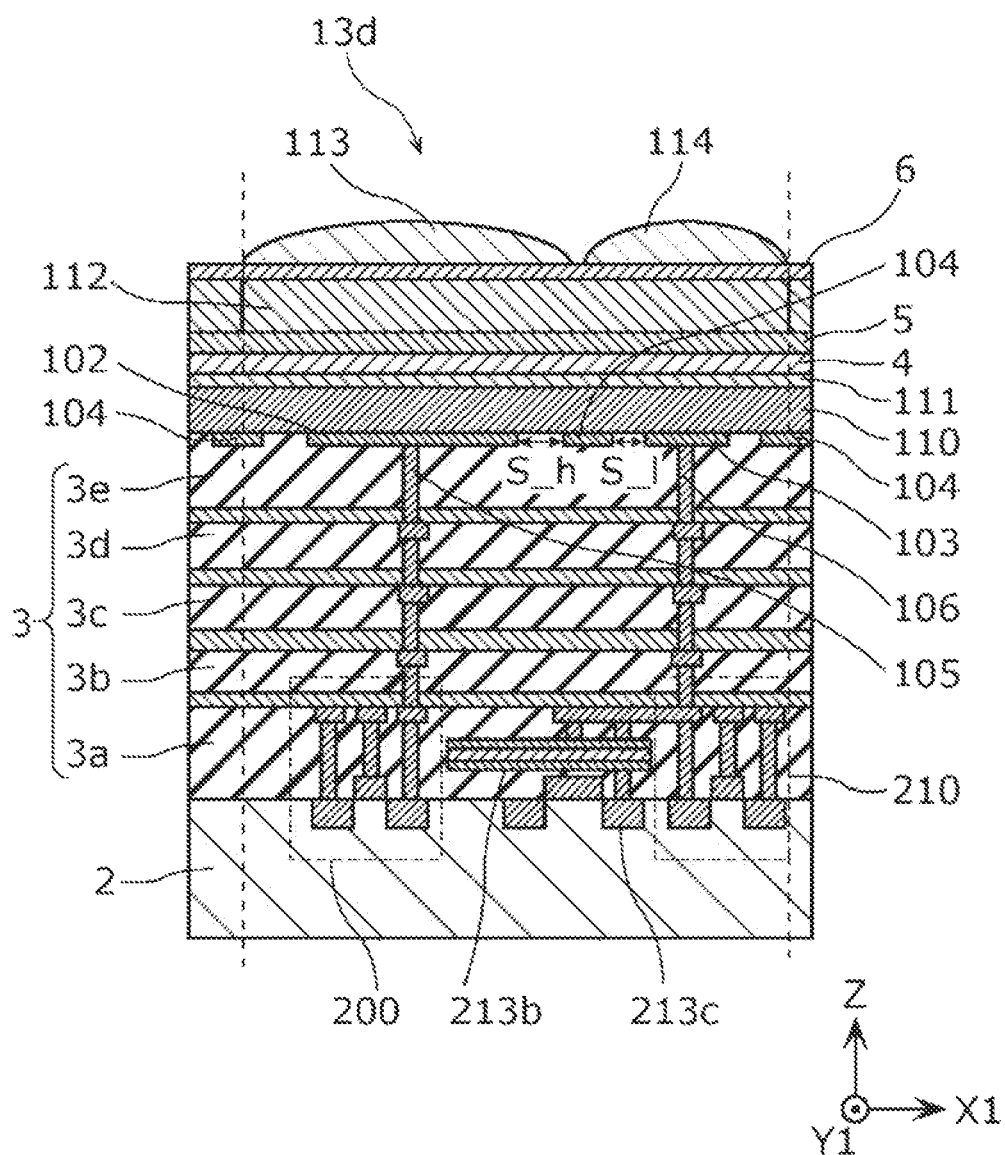
FIG. 23 is a schematic cross-sectional view of still another example of a pixel according to the fourth embodiment.

FIG. 23 is a schematic cross-sectional view of a pixel 13d, which is still another example of a pixel according to the present embodiment. As shown in FIG. 23, in the pixel 13d, instead of the MOM capacitor 213a in the pixel 13 shown in FIG. 19, a MIM capacitor 213b and a MOS capacitor 213c are connected to the charge storage node FD2 connected to the second pixel electrode 103. This results in an increase in the capacitance on the charge storage node FD2 of the second imaging cell 100b1, which makes it possible to further increase the dynamic range. The example shown in FIG. 23 corresponds to a combination of the pixel 11, the pixel 13a, and the pixel 13b, described above.

Figure 24:
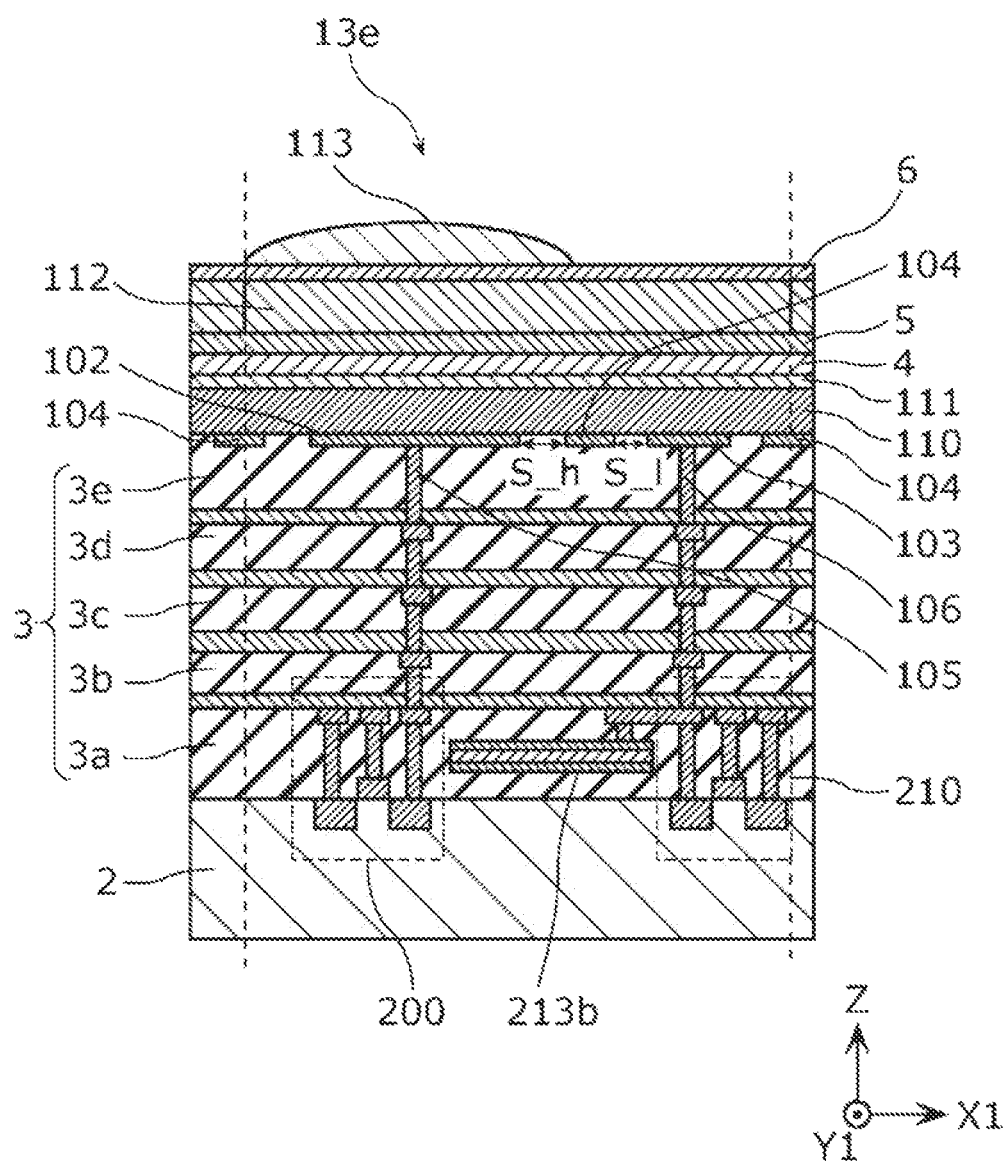
FIG. 24 is a schematic cross-sectional view of still another example of a pixel according to the fourth embodiment.

FIG. 24 is a schematic cross-sectional view of a pixel 13e, which is still another example of a pixel according to the present embodiment. As shown in FIG. 24, the pixel 13e has a configuration obtained by removing the second microlens 114 located above the second pixel electrode 103 in the configuration of the pixel 13a shown in FIG. 20. This results in an increase in the capacitance on the charge storage node FD2 of the second imaging cell 100b1 and a reduction in the light collection rate to the photoelectric conversion layer 110 in a region overlapping, in plan view, the second pixel electrode 103. This results in a further reduction in the sensitivity of the second imaging cell 100b1 and thus it becomes possible to further increase the dynamic range. The example shown in FIG. 24 corresponds to a combination of the pixel 10b, the pixel 11, and the pixel 13a, described above.

As described above, by adopting the configuration according to the present embodiment, the area of the first pixel electrode 102 becomes larger than the area of the second pixel electrode 103, the distance S_h from the first pixel electrode 102 to the auxiliary electrode 104 becomes larger than the distance S_l from the second pixel electrode 103 to the auxiliary electrode 104, and furthermore the capacitance of the second imaging cell 100b1 becomes large due to the provision of the third capacitive element 213. Therefore, the imaging device according to the present embodiment is capable of further increasing the dynamic range while suppressing the color mixing between adjacent pixels by the auxiliary electrode 104.

In the present embodiment, the distance S_h from the first pixel electrode 102 to the auxiliary electrode 104 is larger than the distance S_l from the second pixel electrode 103 to the auxiliary electrode 104, but the configuration is not limited to this example. For example, as in the first embodiment, the distance S_h may be equal to the distance S_l.

Fifth Embodiment

Next, an imaging device according to a fifth embodiment is described below. In the first to fourth embodiments described above, the area of the first pixel electrode 102 is set to be larger, as seen in plan view, than the area of the second pixel electrode 103 thereby achieving the sensitivity ratio such that the ratio of the sensitivity of the first imaging cell to the sensitivity of the second imaging cell is equal to or larger than 1. However, to achieve the sensitivity ratio such that the ratio of the sensitivity of first imaging cell to the sensitivity of the second imaging cell is larger than 1, the area of the first pixel electrode 102 does not necessarily need to be larger than the area of the second pixel electrode 103. The fifth embodiment is different from the fourth embodiment in that the area of the first pixel electrode 102 and the area of the second pixel electrode 103 are equal to each other. In the following description, a focus is put on differences from the first to fourth embodiments and the modifications thereof, and descriptions of similar elements or the like will be omitted or simplified.

Figure 25:
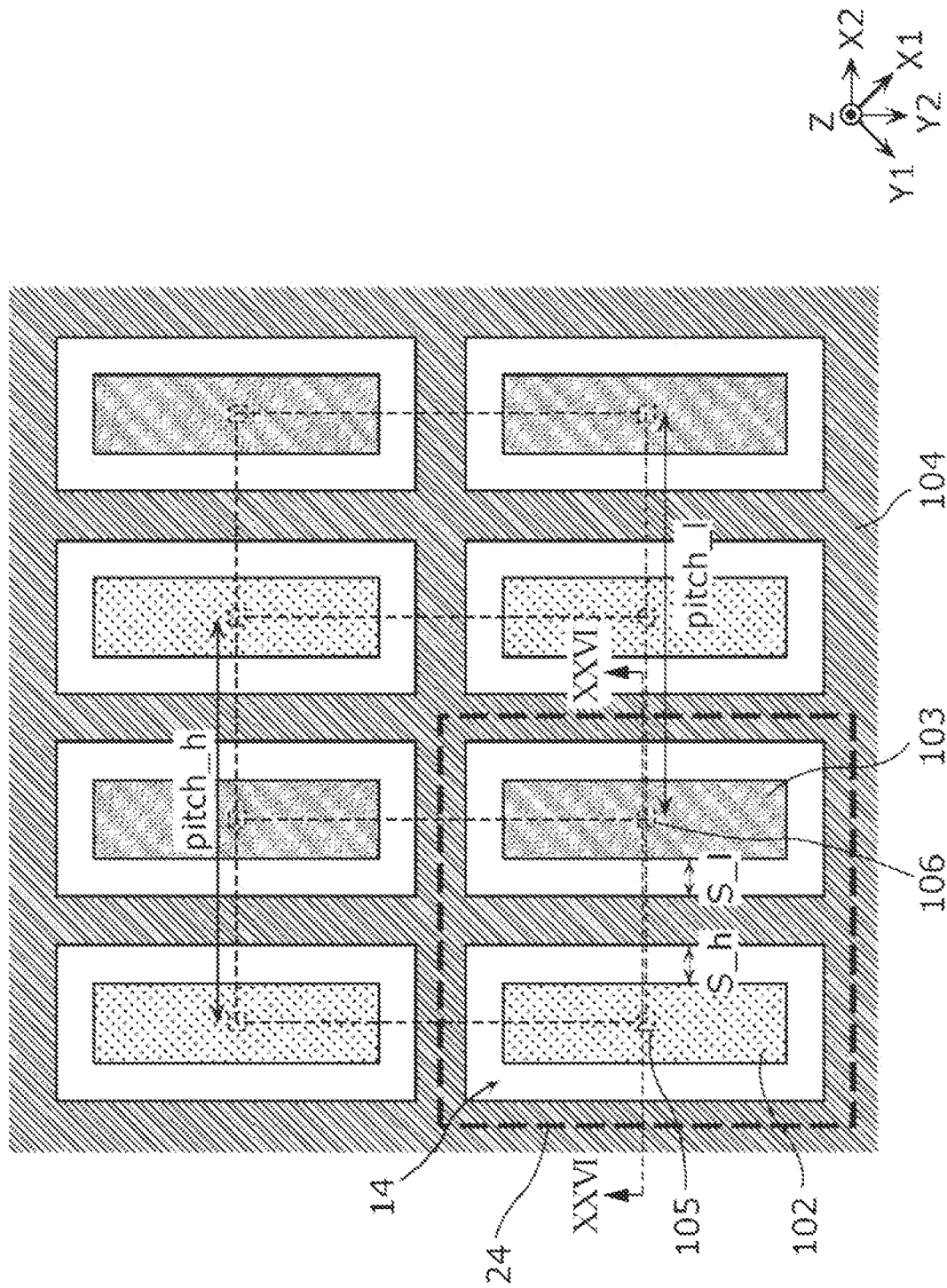
FIG. 25 is a plan view showing an example of a pixel electrode layout according to a fifth embodiment.

FIG. 25 is a plan view showing an example of a layout of electrodes of pixels 14 according to the present embodiment. In each of the plurality of pixels 14, as shown in FIG. 25, in the pixel electrode region 24 corresponding to the pixel 14, as seen in plan view, the area of the first pixel electrode 102 and the area of the second pixel electrode 103 are equal to each other. The pixel 14 has a circuit configuration similar to that of the pixel 13 shown in FIG. 17, and the pixel has a second imaging cell 100b1 including a third capacitive element 213. Therefore, although the area of the first pixel electrode 102 and the area of the second pixel electrode 103 are equal to each other, the sensitivity of the second imaging cell 100b1 can be lower than the sensitivity of the first imaging cell 100a. Therefore, it is not necessary to form pixel electrodes having different areas, it is easy to produce the pixel electrodes, and it is possible to increase the dynamic range while suppressing color mixing between adjacent pixels by the auxiliary electrode 104.

Figure 26:
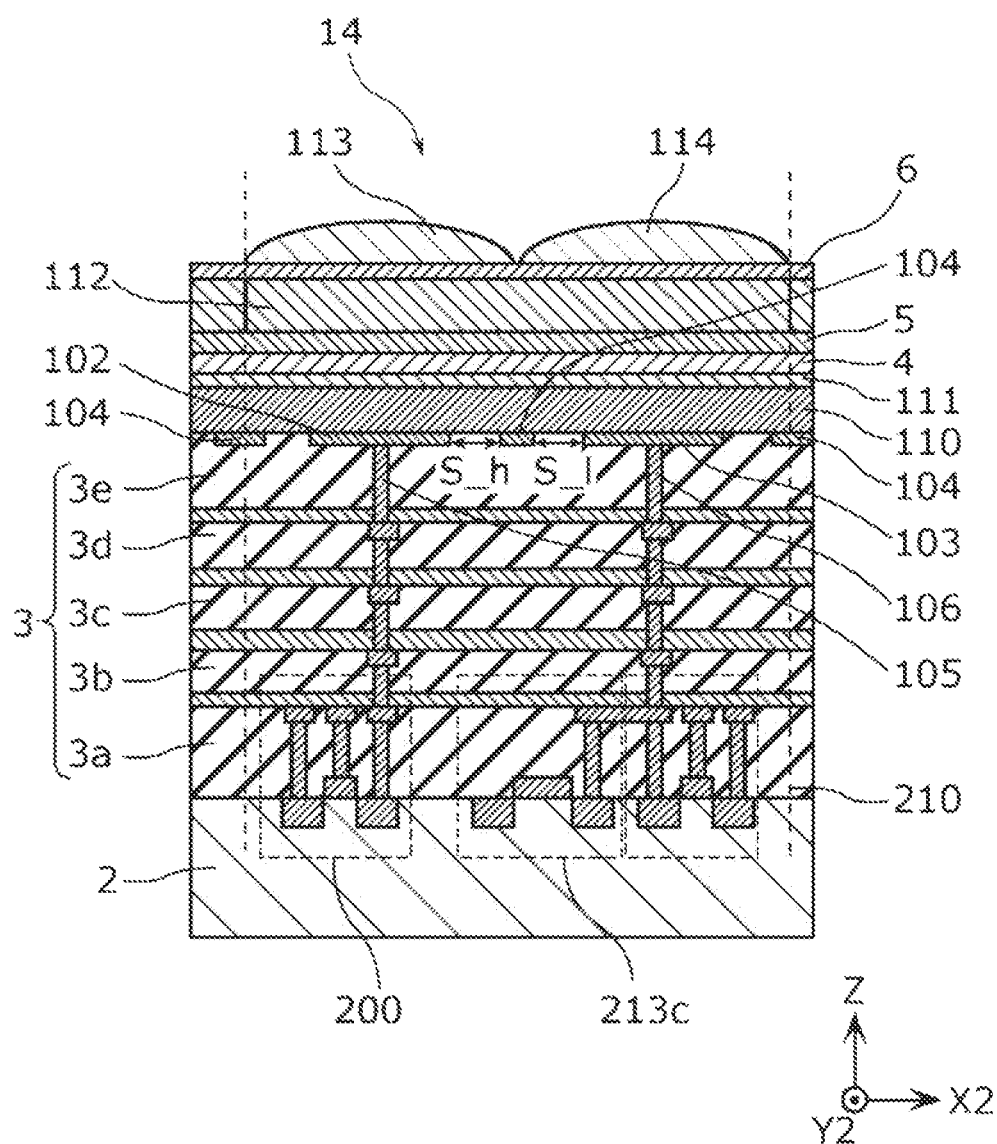
FIG. 26 is a schematic cross-sectional view of a pixel taken along line XXVI-XXVI of FIG. 25 according to the fifth embodiment.

FIG. 26 is a schematic cross-sectional view of the pixel 14 taken along line XXVI-XXVI of FIG. 25. As shown in FIG. 26, in the pixel 14, the distance S_h from the first pixel electrode 102 to the auxiliary electrode 104 is equal to the distance S_l from the second pixel electrode 103 to the auxiliary electrode 104. Furthermore, in the pixel 14, a MOS capacitor 213c is connected as the third capacitive element 213 to the charge storage node FD2 to which the second pixel electrode 103 is connected. This causes an increase in the capacitance on the charge storage node FD2 of the second imaging cell 100b1 to which the second pixel electrode 103 is connected, which results in a reduction in the sensitivity of the second imaging cell 100b1. Therefore, the imaging device according to the present embodiment can achieve an increase in the dynamic range.

First Modification

Next, an imaging device according to a first modification of the fifth embodiment is described below. This modification differs from the fifth embodiment in that the distance S_h is larger than the distance S_l. In the following description, a focus is put on differences from the first to fifth embodiments and the modifications thereof, and descriptions of similar elements or the like will be omitted or simplified.

Figure 27:
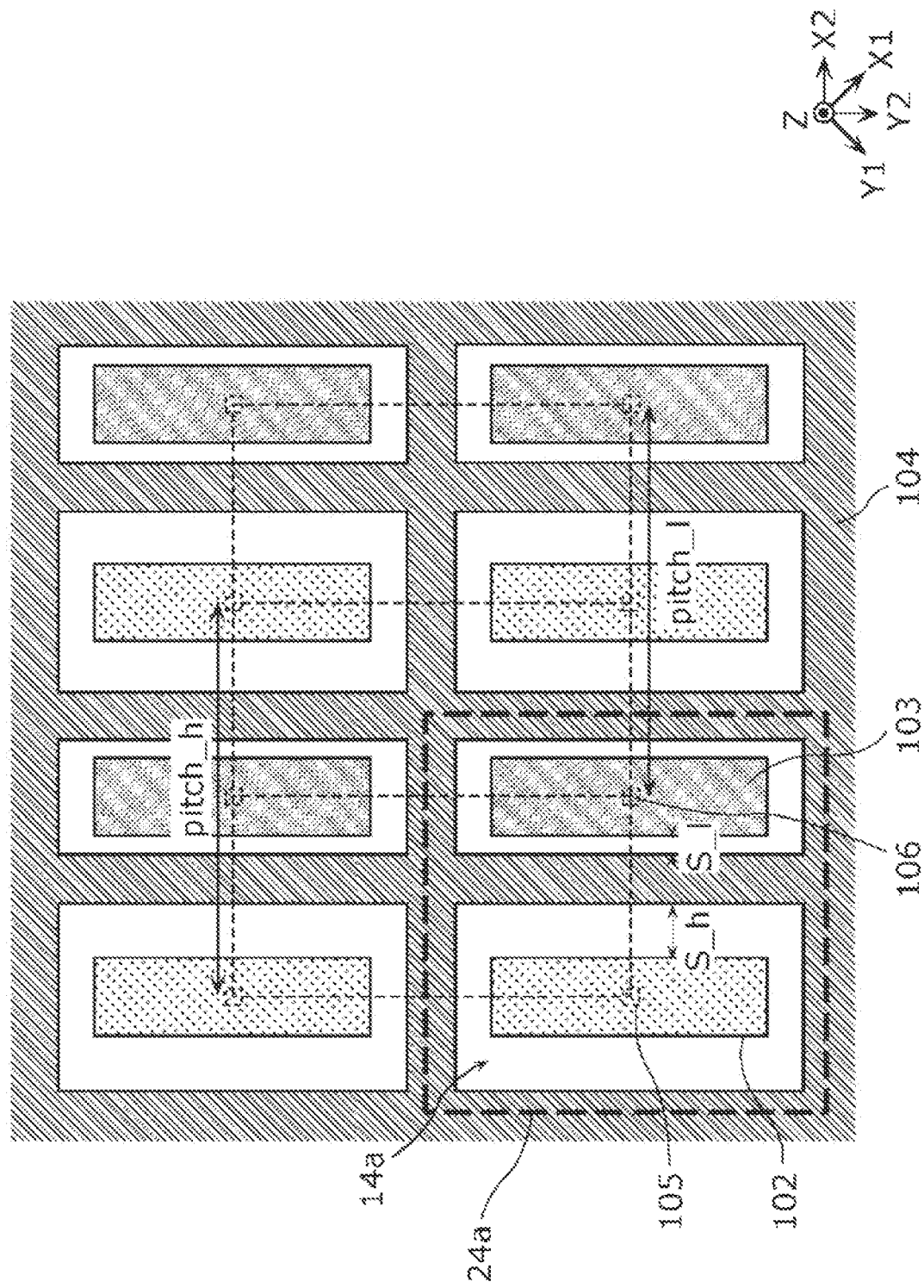
FIG. 27 is a plan view showing an example of a pixel electrode layout according to a first modification of the fifth embodiment.

FIG. 27 is a plan view showing an example of an electrode layout of pixel 14a according to the present modification. As shown in FIG. 27, in the pixel electrode region 24a corresponding to the pixel 14a, as seen in plan view, the area of the first pixel electrode 102 and the area of the second pixel electrode 103 are equal to each other, and the distance S_h between the first pixel electrode 102 and the auxiliary electrode 104 is larger than the distance S_l between the second pixel electrode 103 and the auxiliary electrode 104. As a result, due to effects similar to those in the second embodiment described above, the capacitance on the charge storage node FD2 of the second imaging cell 100b1 is further increased, and thus the imaging device according to the present modification can further increase the dynamic range.

Sixth Embodiment

Figure 28:
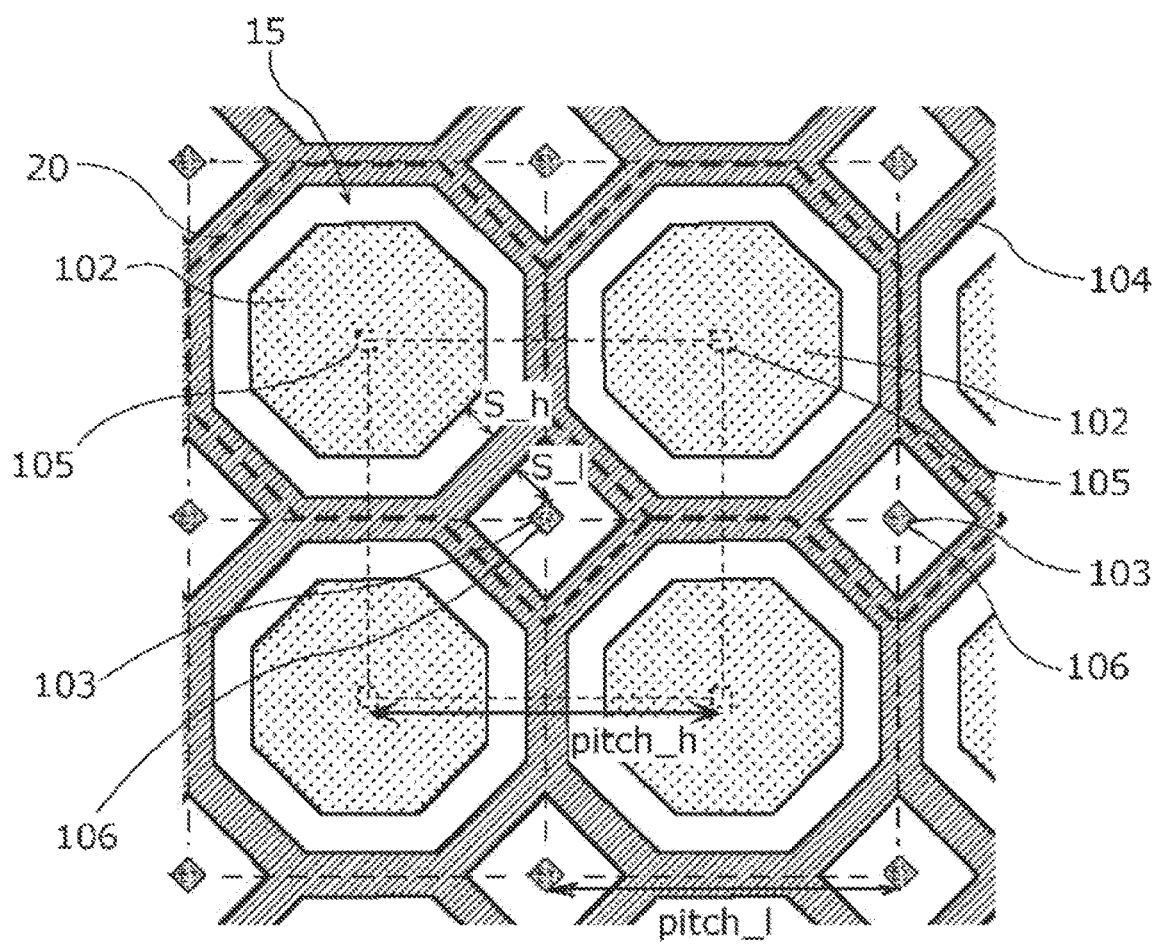
FIG. 28 is a plan view showing an example of a pixel electrode layout according to a sixth embodiment.

FIG. 28 is a plan view showing an example of a pixel electrode layout according to a sixth embodiment. As shown in FIG. 28, the present embodiment is different from the first embodiment described above with reference to FIG. 4 in that the distance S_h from the first pixel electrode 102 to the auxiliary electrode 104 is smaller than the distance S_l from the second pixel electrode 103 to the auxiliary electrode 104. That is, in each of the plurality of pixels 15, the distance S_h is smaller than the distance S_l. The cross-sectional structure of the present embodiment may be the same as that according to the first embodiment described above with reference to FIG. 5 except that the distance S_h from the first pixel electrode 102 to the auxiliary electrode 104 is smaller than the distance S_l from the second pixel electrode 103 to the auxiliary electrode 104.

According to the present embodiment, by increasing the area of the region where the signal charge is collected by the second pixel electrode 103, it is possible to make adjustment so as to reduce the difference between the incidence angle characteristic of the first imaging cell 100a including the first pixel electrode 102 and the incidence angle characteristic of the second imaging cell 100b including the second pixel electrode 103.

Seventh Embodiment

Next, a seventh embodiment is described below with reference to FIG. 29. In the seventh embodiment, a camera system including the imaging device 1 is described.

Figure 29:
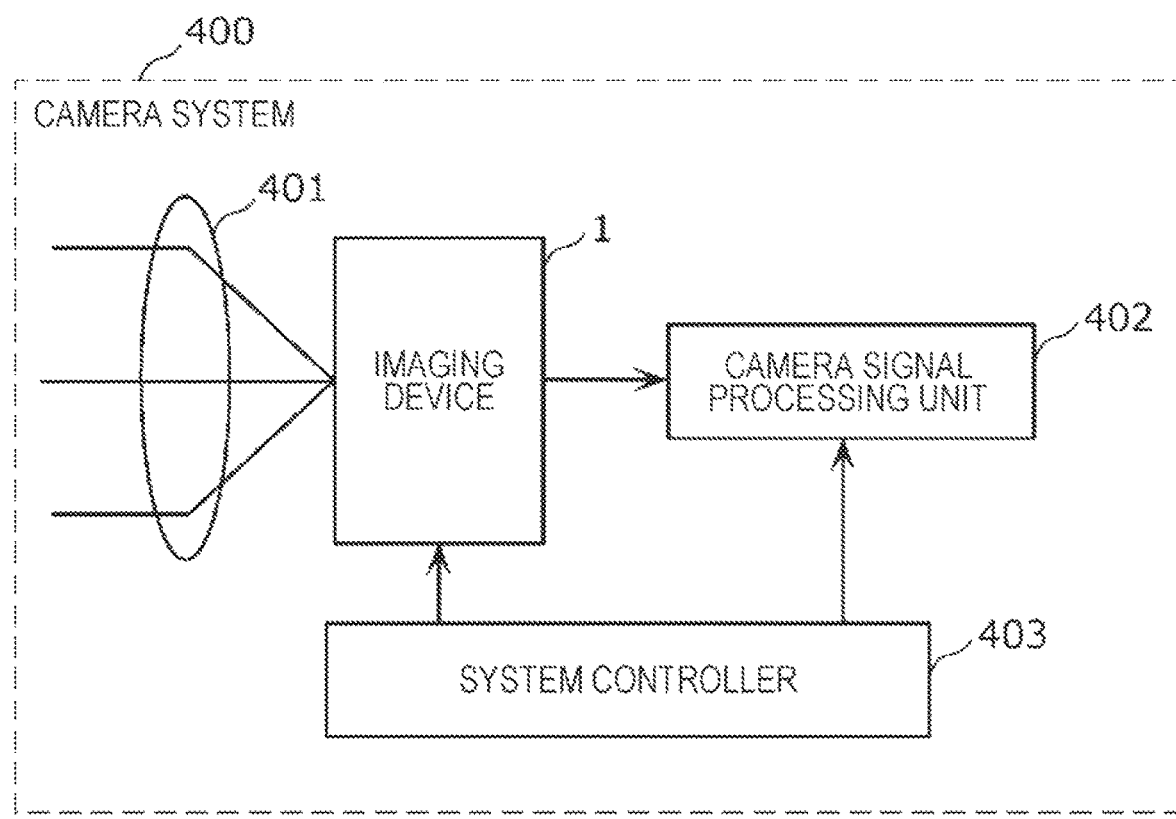
FIG. 29 is a block diagram showing an example of a configuration of a camera system according to a seventh embodiment.

FIG. 29 is a block diagram showing an example of a configuration of the camera system according to the seventh embodiment.

As shown in FIG. 29, the camera system 400 according to the present embodiment includes the imaging device 1 according to the first embodiment described above, an optical system 401 for focusing light by a lens or the like, a camera signal processing unit 402 for performing signal processing on data captured by the imaging device 1 and outputting the result as an image or data, and a system controller 403 for controlling the imaging device 1 and the camera signal processing unit 402.

The optical system 401 is a lens or the like for focusing light into an imaging region of the imaging device 1.

The camera signal processing unit 402 functions as a signal processing circuit that processes the signal output from the imaging device 1. The camera signal processing unit 402 performs processing such as a gamma correction, color interpolation processing, spatial interpolation processing, an auto white balance adjustment, a distance measurement calculation, a wavelength information separation, and the like. The camera signal processing unit 402 is realized by, for example, a DSP (Digital Signal Processor) or the like.

The system controller 403 controls the entire camera system 400. The system controller 403 may be realized by, for example, a processor having a program stored therein, a microcomputer, or the like.

According to the present embodiment, since the imaging device 1 according to the first embodiment is used in the camera system 400, it becomes possible to provide the camera system having the multilayer-type imaging element capable of efficiently collect the signal charge and achieving a wide dynamic range while suppressing color mixing between adjacent pixels.

The camera system 400 may include the imaging device according to one of the second to sixth embodiments and modifications thereof instead of the imaging device 1 according to the first embodiment.

Other Embodiments

Although the imaging device and the camera system according to one or more aspects have been described above referring to various embodiments and modifications, the present disclosure is not limited to these embodiments and modifications. It will be obvious to those skilled in the art that various modifications and changes can be made in the embodiments, and various constituent elements of different embodiments may be combined, without departing from the spirit and the scope of the present disclosure. It should be noted that any aspect obtained by such modifications or combinations will fall within the scope of the present disclosure.

For example, although in the above-described embodiments and modifications, configurations of an imaging device capable of efficiently collecting signal charges and realizing a wide dynamic range while suppressing color mixing between adjacent pixels have been described, some of these configurations may be combined.

The imaging device and the like according to the present disclosure may be used in various applications such as digital still cameras, medical cameras, surveillance cameras, in-vehicle cameras, digital single-lens reflex cameras, and digital mirrorless single-lens cameras, and other various camera systems or sensor systems.

What is claimed is:

1. An imaging device comprising:
a counter electrode;
a photoelectric conversion layer that converts light into a signal charge;
a plurality of sets of electrodes facing the counter electrode via the photoelectric conversion layer to collect the signal charge, each of the plurality of sets including a first electrode included in a high-sensitivity pixel and a second electrode included in a low-sensitivity pixel with a sensitivity lower than a sensitivity of the high-sensitivity pixel; and
an auxiliary electrode that is located between the first electrode and the second electrode in each of the plurality of sets in a plan view, the auxiliary electrode facing the counter electrode via the photoelectric conversion layer, the auxiliary electrode being included commonly in the high-sensitivity pixel and the low-sensitivity pixel,
wherein a shortest distance between the first electrode and the auxiliary electrode is different from a shortest distance between the second electrode and the auxiliary electrode.

2. The imaging device according to claim 1, wherein the shortest distance between the first electrode and the auxiliary electrode is greater than the shortest distance between the second electrode and the auxiliary electrode.

3. The imaging device according to claim 1, wherein in each of the plurality of sets, an area of the first electrode is greater than an area of the second electrode in the plan view.

4. The imaging device according to claim 1, wherein the auxiliary electrode is a single electrode having a plurality of openings.

5. The imaging device according to claim 4, wherein
the plurality of openings include a first opening and a second opening adjacent to the first opening,
the first electrode is located in the first opening, and
the second electrode is located in the second opening.

* * * * *